US012340385B2

(12) United States Patent
Besehanic et al.

(10) Patent No.: US 12,340,385 B2
(45) Date of Patent: *Jun. 24, 2025

(54) METHODS AND APPARATUS FOR ASSOCIATING MEDIA DEVICES WITH A DEMOGRAPHIC COMPOSITION OF A GEOGRAPHIC AREA

(71) Applicant: The Nielsen Company (US), LLC, New York, NY (US)

(72) Inventors: Jan Besehanic, Tampa, FL (US); Paul Mears, Safety Harbor, FL (US); Joseph G. Milavsky, Dunedin, FL (US); Robert A. Luff, Wittman, MD (US); Arun Ramaswamy, Tampa, FL (US); David Howell Wright, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/482,933

(22) Filed: Oct. 9, 2023

(65) Prior Publication Data

US 2024/0127276 A1    Apr. 18, 2024

Related U.S. Application Data

(63) Continuation of application No. 18/155,015, filed on Jan. 16, 2023, now Pat. No. 11,783,356, which is a
(Continued)

(51) Int. Cl.
*G06Q 30/0204*  (2023.01)
*G06Q 30/02*    (2023.01)
(Continued)

(52) U.S. Cl.
CPC ........ *G06Q 30/0205* (2013.01); *G06Q 30/02* (2013.01); *H04L 67/535* (2022.05);
(Continued)

(58) Field of Classification Search
CPC ............... G06Q 30/0205; G06Q 30/02; G06Q 30/0201; H04W 4/025; H04L 67/22;
(Continued)

(56) References Cited

U.S. PATENT DOCUMENTS

2007/0011039 A1 * 1/2007 Oddo ................. G06Q 30/0201
                                                        705/7.33
2008/0243822 A1 * 10/2008 Campbell ........... G06F 16/9537
                                                        707/999.005
(Continued)

FOREIGN PATENT DOCUMENTS

JP    WO 2003069572 A1 * 6/2005

*Primary Examiner* — Nizar N Sivji

(57) ABSTRACT

Example methods and apparatus for associating media devices with a demographic composition of a geographic area are disclosed. Disclosed example apparatus are to obtain a plurality of Internet Protocol addresses assigned to a media device associated with a panel member. Disclosed example apparatus are also to determine a most used Internet Protocol address from the plurality of Internet Protocol addresses, determine a geographic location corresponding to the most used Internet Protocol address, associate a geographic area with the media device in response to a determination that the geographic location corresponds to a location of an internet service provider, determine a demographic profile associated with the geographic area, and associate the demographic profile with the media device.

20 Claims, 11 Drawing Sheets

Related U.S. Application Data continuation of application No. 17/208,709, filed on Mar. 22, 2021, now Pat. No. 11,556,946, which is a continuation of application No. 16/901,969, filed on Jun. 15, 2020, now Pat. No. 10,956,923, which is a continuation of application No. 16/112,366, filed on Aug. 24, 2018, now Pat. No. 10,685,365, which is a continuation of application No. 14/462,190, filed on Aug. 18, 2014, now Pat. No. 10,078,846, which is a continuation of application No. 12/336,338, filed on Dec. 16, 2008, now Pat. No. 8,812,012.

(51) Int. Cl.
| | | |
|---|---|---|
| G06Q 30/0201 | (2023.01) | |
| H04L 43/0811 | (2022.01) | |
| H04L 61/5014 | (2022.01) | |
| H04L 67/50 | (2022.01) | |
| H04L 101/69 | (2022.01) | |
| H04L 101/695 | (2022.01) | |
| H04W 4/02 | (2018.01) | |

(52) U.S. Cl.
CPC ..... *H04W 4/025* (2013.01); *G06F 2221/2111* (2013.01); *G06Q 30/0201* (2013.01); *H04L 43/0811* (2013.01); *H04L 61/5014* (2022.05); *H04L 2101/69* (2022.05); *H04L 2101/695* (2022.05); *H04M 2215/22* (2013.01)

(58) Field of Classification Search
CPC ............... H04L 61/2015; H04L 61/609; H04L 29/1299; H04L 29/12981; H04L 43/0811; H04M 2215/22; G06F 2221/2111
See application file for complete search history.

(56) References Cited

U.S. PATENT DOCUMENTS

| | | | |
|---|---|---|---|
| 2009/0019182 A1* | 1/2009 | Riise ...................... | G06Q 10/00 709/245 |
| 2009/0132559 A1* | 5/2009 | Chamberlain ......... | G06Q 30/02 707/999.102 |
| 2009/0138593 A1* | 5/2009 | Kalavade .............. | H04W 4/029 709/224 |
| 2009/0187939 A1* | 7/2009 | Lajoie ................ | H04N 7/17318 725/87 |
| 2010/0004997 A1* | 1/2010 | Mehta ................ | G06Q 30/0269 705/14.66 |
| 2011/0314084 A1* | 12/2011 | Saretto ............... | G06Q 30/0269 709/203 |

* cited by examiner

| DEVICE ID | IP ADDRESS | START TIME | STOP TIME | BANDWIDTH |
|---|---|---|---|---|
| MAC01 | IP ADDR 02 | 8/1/08 7:30 AM | 8/15/08 9:15 AM | 135 MB |
| MAC01 | IP ADDR 23 | 8/15/08 2:45 PM | 8/22/08 7:05 PM | 10 MB |
| MAC01 | IP ADDR 16 | 8/22/08 10:30 PM | 8/31/08 11:35 PM | 62 MB |
| MAC02 | IP ADDR 67 | 9/1/08 4:30 AM | 8/22/08 2:30 AM | 84 MB |
| MAC02 | IP ADDR 04 | 8/22/08 2:45 AM | 9/31/08 10:55 AM | 742 MB |

FIG. 4 (400)

| DEVICE ID | IP ADDRESS | START TIME | STOP TIME | REGION | CITY | ZIP CODE | BLOCK | LATITUDE | LONGITUDE |
|---|---|---|---|---|---|---|---|---|---|
| MAC01 | IP ADDR 02 | 8/1/08 7:30 AM | 8/15/08 9:15 AM | SOUTHERN CA | LOS ANGELES | 90015 | 1111 S FIGUEROA ST. | 34.042579 | -118.267565 |
| MAC02 | IP ADDR 67 | 8/1/08 4:30 AM | 8/22/08 2:30 AM | NORTHERN IL | CHICAGO | 60606 | 100 S WACKER DR. | 41.879598 | -87.637677 |

FIG. 5 (500)

| DEVICE ID | IP ADDRESS | ZIP CODE | POPULATION | GENDER (MALE) | MEDIAN AGE | HOUSEHOLD SIZE | AGI | TOP 3 RACES |
|---|---|---|---|---|---|---|---|---|
| MAC01 | IP ADDR 02 | 90015 | 15134 | 52.70% | 27.8 | 3.0 | 26640 | Hispanic, Asian, White |
| MAC02 | IP ADDR 67 | 60606 | 1682 | 53.80% | 34.9 | 1.6 | 372829 | White, Asian, Hispanic |

| DEVICE TYPE | ZIP CODE | NUMBER OF SAMPLED DEVICES | POPULATION | GENDER (MALE) | MEDIAN AGE | HOUSEHOLD SIZE | AGI | TOP 3 RACES | COLLEGE DEGREE |
|---|---|---|---|---|---|---|---|---|---|
| DEVICE TYPE 1 | 90015 | 158 | 15134 | 52.70% | 27.8 | 3.0 | 26640 | Hispanic, Asian, White | 15% |
| DEVICE TYPE 2 | 90015 | 39 | 15134 | 52.70% | 27.8 | 3.0 | 26640 | Hispanic, Asian, White | 15% |
| DEVICE TYPE 3 | 90015 | 47 | 15134 | 52.70% | 27.8 | 3.0 | 26640 | Hispanic, Asian, White | 15% |
| DEVICE TYPE 1 | 60606 | 14 | 1682 | 53.80% | 34.9 | 1.6 | 372809 | White, Asian, Hispanic | 73% |
| DEVICE TYPE 2 | 60606 | 45 | 1682 | 53.80% | 34.9 | 1.6 | 372809 | White, Asian, Hispanic | 73% |
| DEVICE TYPE 3 | 60606 | 63 | 1682 | 53.80% | 34.9 | 1.6 | 372809 | White, Asian, Hispanic | 73% |

| REGION | DEVICE TYPE | ESTIMATED NUMBER OF USERS | GENDER (MALE) | MEDIAN AGE | HOUSEHOLD SIZE | AGI | MAJORITY RACES | COLLEGE DEGREE |
|---|---|---|---|---|---|---|---|---|
| NORTHERN IL | DEVICE TYPE 1 | 1274 | 54.20% | 29.4 | 2.3 | 75290 | WHITE, HISPANIC | 35% |
| NORTHERN IL | DEVICE TYPE 2 | 18437 | 55.10% | 32.7 | 3.1 | 113845 | WHITE, ASIAN | 43% |
| NORTHERN IL | DEVICE TYPE 3 | 25735 | 49.70% | 36.8 | 2.9 | 99529 | WHITE, HISPANIC | 39% |
| SOUTHERN CA | DEVICE TYPE 1 | 75148 | 56.70% | 26.7 | 1.3 | 25784 | HISPANIC, WHITE | 11% |
| SOUTHERN CA | DEVICE TYPE 2 | 36745 | 51.70% | 31.7 | 1.7 | 37861 | HISPANIC, ASIAN, WHITE | 18% |
| SOUTHERN CA | DEVICE TYPE 3 | 22175 | 54.60% | 32.4 | 1.5 | 39455 | HISPANIC, WHITE | 19% |

METHODS AND APPARATUS FOR ASSOCIATING MEDIA DEVICES WITH A DEMOGRAPHIC COMPOSITION OF A GEOGRAPHIC AREA

RELATED APPLICATIONS

This patent is a continuation of U.S. patent application Ser. No. 18/155,015, filed Jan. 16, 2023, which issued as U.S. Pat. No. 11,783,356, and which is a continuation of U.S. patent application Ser. No. 17/208,709, filed on Mar. 22, 2021, which issued as U.S. Pat. No. 11,556,946, and which is a continuation of U.S. patent application Ser. No. 16/901,969, filed on Jun. 15, 2020, which issued as U.S. Pat. No. 10,956,923, and which is a continuation of U.S. patent application Ser. No. 16/112,366, filed on Aug. 24, 2018, which issued as U.S. Pat. No. 10,685,365, and which is a continuation of U.S. patent application Ser. No. 14/462,190, filed on Aug. 18, 2014, which issued as U.S. Pat. No. 10,078,846, and which is a continuation of U.S. patent application Ser. No. 12/336,338, filed on Dec. 16, 2008, which issued as U.S. Pat. No. 8,812,012. U.S. patent application Ser. Nos. 18/155,015; 17/208,709; 16/901,969; 16/112,366; 14/462,190; and 12/336,338 are hereby incorporated by reference in their respective entireties. Priority to U.S. patent application Ser. Nos. 18/155,015; 17/208,709; 16/901,969; 16/112,366; 14/462,190; and 12/336,338 is claimed.

FIELD OF THE DISCLOSURE

This disclosure relates generally to data collection on media devices and, more particularly, to methods and apparatus for associating media devices with the demographic composition of a geographic area.

BACKGROUND

The increasing number of media devices including cellular phones, laptops, personal digital assistants, text message machines, wireless gaming machines, music players, etc. has increased the need to measure their use for various purposes. For example, measuring a user's interaction with a media device provides visibility of the types of services and applications that may interest a user. Similarly, measuring the performance and usage of a media device enables manufacturers, wireless service providers, content providers, marketers, etc. to improve and market future products and services.

In addition to media device usage information, marketers and device manufacturers are interested in the demographic information and the geographic information associated with purchased media devices. Marketers may use the information to analyze different demographic components to predict demand for future products and services. For example, a company that manufactures and sells a cellular phone may sell applications for that cellular phone on the company website. By knowing the locations where the cellular phones are typically used and the typical demographics of users of the cell phones, the company can directly target potential customers who are more likely to purchase cell phone applications from the company. Targeted marketing may include direct mailings, text messages to likely customers, and/or media advertisements in concentrated locations of potential customers.

Currently, marketers and device manufactures use labor intensive methods to determine demographic information and geographic information associated with media devices. These methods may include questioning focus groups, tracking individual customers, and/or random sampling and questioning of people. Alternatively, many products include registration cards with links to the manufacturer's web site for customers to register their recently purchased product, their geographic information, and their demographic information. However, the labor intensive methods and product registration methods tend to yield marginal results because a very small percentage of customers may actually register their products, and/or random sampling may include hidden biases. As the competition between media device manufactures increases, the difference between a successful product and a marginally successful product may be determined by the accuracy of marketing data and the ability of a manufacturer to design a media device more aligned to what the target market desires.

BRIEF DESCRIPTION OF THE DRAWINGS

FIG. 4 shows a table of example IP address records from two media devices.

FIG. 5 shows a table of the most used IP addresses from the table in FIG. 4 associated with example geographic location data.

FIG. 6 shows a table of the zip codes associated with the most used IP addresses from the table of FIG. 5 associated with example demographic profile data.

FIG. 7 shows a report of example demographic profiles for three different types of media devices in two geographic zip codes.

FIG. 8 shows another report of example average demographic profiles for each of the three different types of media devices in two geographic regions.

DETAILED DESCRIPTION

Figure 1:
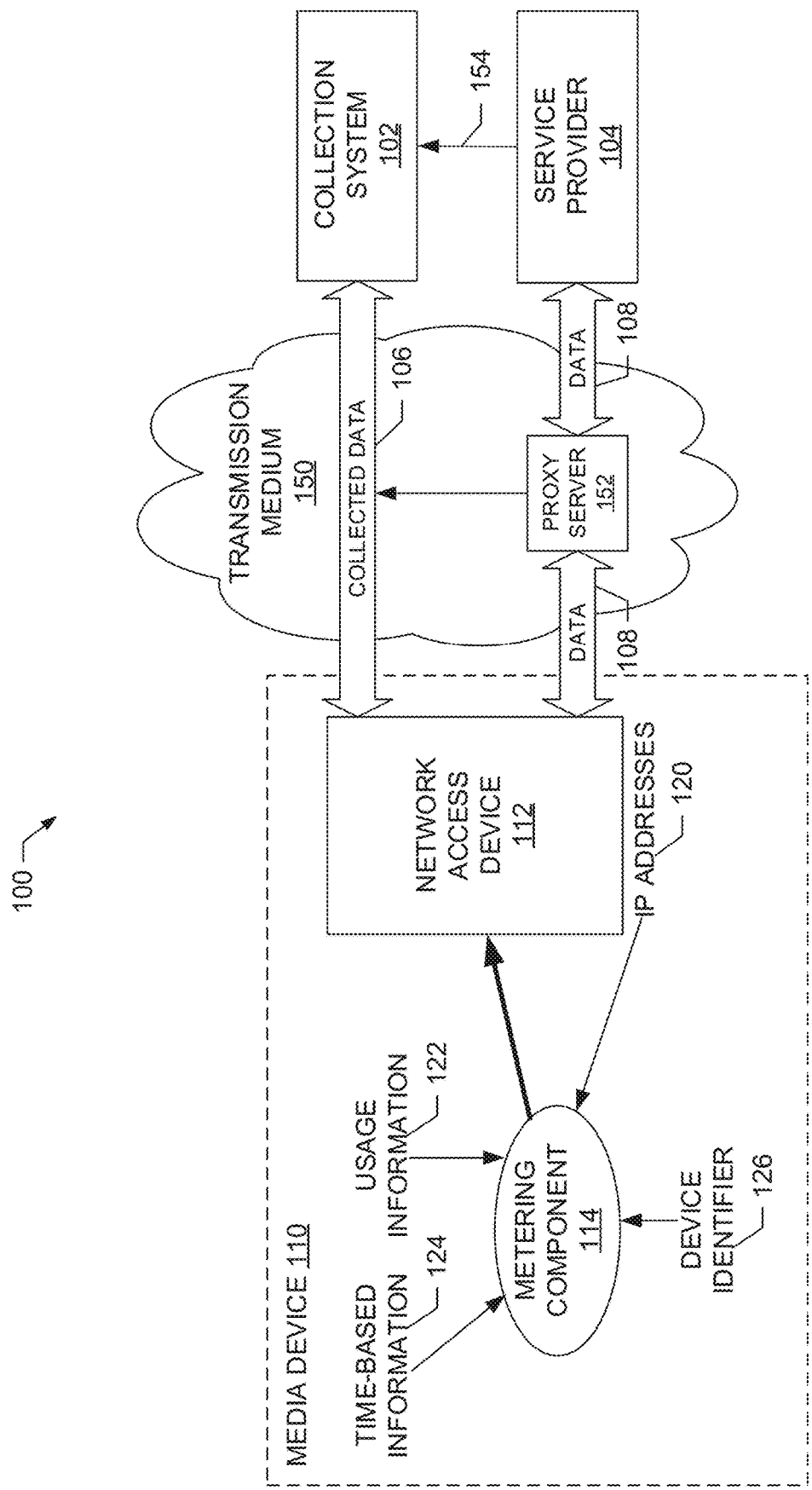
FIG. 1 is a schematic diagram showing an example network system including an example collection system.

The example methods and apparatus described herein are used for associating media devices with the demographic composition of a geographic area. An example method includes receiving a plurality of Internet Protocol (IP) addresses assigned to a media device associated with a panel member. Then, determining a most used IP address from the plurality of IP addresses. Next, accessing geographic information and determining a geographic location corresponding to the most used IP address. The example further includes accessing demographic information and determining a demographic profile associated with the geographic location corresponding to the most used IP address. Then, associating at least one of the geographic location or the demographic profile with the media device.

An example apparatus includes a receiver to receive a plurality of IP addresses assigned to a media device associated with a panel member. The example apparatus further includes an address resolver to determine a most used IP address from the plurality of IP addresses, access geographic information, access demographic information, determine a geographic location corresponding to the most used IP address, determine a demographic profile associated with the geographic information, and associate at least one of the geographic location or the demographic profile with the media device. Additionally, the example apparatus includes a demographic database to store demographic profiles by geographic location and a geographic database to store geographic locations by IP addresses.

Currently, media device marketers and device manufactures use labor intensive methods to determine demographic information and geographic information associated with media devices. These methods may include questioning focus groups, tracking individual customers, and/or random sampling and questioning of individuals. However, these labor intensive methods tend to yield marginal results because the random sampling or tracking may include biases. For example, individuals with highly unfavorable experiences with a certain media device are more likely to respond to a survey than those having favorable experiences. In another example, a random sampling of individuals in a particular street corner in the middle of a financial district may be biased towards individuals with financial backgrounds and would not represent the city and/or the region.

Alternatively, many products include registration cards with links to a manufacturer's web site for customers to register their recently purchased product with their geographic information and their demographic information. However, the product registration methods tend to yield marginal results because a very small percentage of customers may actually register their products. Furthermore, those customers that register their products may be biased towards those with internet access or customers patient enough to read and fill out a registration form.

The example methods described herein associate demographic information with media devices by identifying electronic addresses of media devices, associating the electronic addresses with geographic locations, and associating demographic profiles with each of the geographic locations. The example methods then associate the demographic profiles to the media devices through the electronic addresses. These methods may compile demographic information per media device type, demographic information per media device usage, and/or demographic information by applications on the media device. The compiled demographic information may be used to generate market summary reports. These reports may be used by media device marketers and/or media device manufacturers to obtain media device demographic information.

The example methods described herein may compile data representative of media devices used in all regions of the world by different demographic compositions because most of these media devices are configured to enable connectivity to the Internet. This enables the indiscriminate unbiased collection of data from random samples for any geographic location with minimal labor. The example methods further include methods for processing the collected data and compiling the collected data into useful statistics and usage information for device manufacturers, marketing entities, application developers, and/or any other third party who may be interested in the demographics associated with media devices.

In an example implementation, a collection system receives a plurality of IP addresses from one or more media devices over a period of time. The period of time may include a week, a month, a few months, and/or a year. The received IP addresses are linked by the collection system to identifiers of the media devices to which each of the IP addresses is assigned. The device identifier may include a device type, a media access control (MAC) address of each media device, applications within each media device, and/or any other type of media device identifying information. The collection system then determines which IP address was used the most for a time period for each media device. The determining of the most used IP address may include the IP address used for the longest period of time, the IP address associated with the most bandwidth usage, or the IP address used by the media device to access the Internet for the longest period of time during the time period.

The most used IP address corresponds to the most likely home geographic location of a user of a media device. The most used IP address corresponds to the home location of the media device. For example, the home location may correspond to the location where the user of the media device lives. A user may travel with a media device and, as a result, when the media device accesses the Internet from a different location, a new IP address is assigned corresponding to the new location. Thus, by determining the most used IP address, the example methods described herein ensure the media device is associated with its home location.

Upon determining the most used IP address, the collection system assesses a geographic database that includes a list of IP address prefixes and their corresponding geographic locations. The list may be as precise as determining an IP address to the nearest city block or to a geographic region (e.g., Westmoreland County, Pennsylvania). The collection system includes an address resolver to match the IP address to a geographic location. In some example implementations, the most used IP address may correspond to the owner of an IP address (e.g., a service provider). In these cases, the owner is typically in the same general geographic location as the user of the media device. For example, the owner of an IP address may be in one zip code within a city and the media device user is located in an adjacent zip code in the same city. In this case, the most used IP address is associated with the general area covering the owner and the user of the IP address.

Upon associating the most used IP address with a geographic location, the collection system associates demographic information with the media device. The collection system includes a demographic data base with demographic profiles for each of the geographic locations. The demographic information may include race, ethnicity, education level, adjusted gross income per household, number of members per household, gender, population, and/or any other demographic composition information. The address resolver accesses the demographic database and determines the demographics associated with the geographic location for the most used IP address. The address resolver then associates the demographic information with the media device of the most used IP address. Associating may include linking the demographic information to an electronic record including the media device. Additionally, associating may include linking a reference code corresponding to a typical demographic profile to an identifier of the media device. The profile may include a complete demographic composition for a geographic location and/or a most likely demographic for the geographic location. For example, the demographic profile for a location may include the top three demographics by percentage in the location and demographic distributions such as education level and income.

The collection system then combines the demographic information for a plurality of media devices and compiles statistics from the information. The statistics may correlate media device type and the top three corresponding demographic compositions, typical demographic profiles per media device per geographic location, and/or media device usage per demographic composition per geographic location. The compiled information is then used to generate reports for marketing entities, device manufacturers, application developers and/or any other interested third party. These entities may use the information for targeted marketing, product improvements, and/or planning future products.

Although the following discloses example apparatus including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

An example network system 100 is shown in FIG. 1. The example network system 100 includes a collection system 102, a service provider 104, a transmission medium 150, and a media device 110. For brevity, only one media device 110 and one service provider 104 are shown. However, the example network 100 may include a plurality of media devices 110 connected through the transmission medium 150 (e.g., the Internet) to one or more service providers 104. The transmission medium 150 provides a framework for the media device 110 to access servers, the service providers 104, and the other media devices connected to the Internet. Additionally, the example network system 100 enables the collection system 102 to receive IP addresses and corresponding information from the media device 110 and/or from other media devices connected to the transmission medium 150.

The media device 110 of FIG. 1 includes a metering component 114 and a network access device 112. Additionally, the media device 110 includes any number of integrated circuits, microcontrollers, processors, wireless chips, power supplies, signal processing circuits, noise filtering circuits, video drivers, sound cards, displays, antennas, input/output ports, and/or any other hardware component for displaying and playing media. For brevity, these hardware components are not shown in the media device 110. Furthermore, the media device 110 may include executable software, cable, instructions, etc. stored on a computer readable medium for processing and displaying media received from media sources. The media device 110 may be any type of media device including a cellular phone, a laptop, a personal digital assistant (PDA), an audio player, a portable video player, a gaming machine, a personal computer, a cable receiver, a satellite receiver, and/or any other media device that can connect to the Internet.

In the example shown in FIG. 1, the media device 110 may be in the possession of and/or belong to a panel member. Additionally, the media devices 110 may be shared between a plurality of panel members. Furthermore, the one panel member may use a plurality of media devices including the media device 110. The media device 110 uses the metering component 114 for logging IP address information (e.g., IP addresses and corresponding information) and device usage information. In other example implementations, the media device 110 may store and transmit IP address information to the collection system 102 without a metering component 114. In yet other example implementations, the media device 110 may transmit IP address information to the collection system 102 upon receiving an IP address.

The media device 110 includes a hardware identification number (e.g., a device identifier 126). This number may include a MAC address that is assigned to the media device 110 during its manufacture. The MAC address and/or hardware identification number is a unique number that includes information identifying the make and model of the media device 110. This identification number or device identifier 126 may be transmitted to the collection system 102 upon request and may be included in IP address information sent to the collection system 102. The device identifier 126 enables the collection system 102 to organize IP address information by media device. Additionally, the device identifier 126 enables the collection system 102 to determine the make and model of the media device 110.

The metering component 114 within the media device 110 may be activated by a panel member subscribing to and/or registering with a metering service such as, for example, Nielsen Mobile. The collection system 102 may send the metering component 114 to the subscribing panel member to install and/or attach to the media device 110. The metering component 114 may be sent as software over one of the transmission medium 150 and/or sent within a memory device via the mail. Additionally or alternatively, the metering component 114 may be installed within a hardware component such as, for example, an application specific integrated circuit (ASIC), and/or installed or embedded within an operating system and/or read only memory (ROM) during manufacture of the media device 110. In this example, the panel member may register with the metering service to activate the metering component 114.

In the example system 100, the metering component 114 monitors the media device 110 for IP address changes. The IP address changes include receiving an IP address from the service provider 104 and/or receiving an IP address from a dynamic host configuration protocol (DHCP) server. The service provider 104 and/or the DHCP server may assign the media device a dynamic IP address or a static IP address. The dynamic IP address may be replaced by another dynamic IP address weekly, biweekly, monthly, and/or every few months depending on IP configurations within the service provider 104 and/or the DHCP server. The static IP address may be assigned to the media device 110 for a long time period including a few months to a few years. In other example implementations, the metering component 114 may monitor for other network addresses assigned to the media device 110. Other network addresses may include telephone numbers, private IP address, subnet addresses, etc.

The metering component 114 may also meter the time and/or date (e.g., time-based information 124) an IP address is assigned to the media device 110. Additionally, the metering component 114 stores a copy IP address 120 of an assigned IP address. For example, if the media device 110 receives a replacement IP address to replace a first IP address, the metering component 114 meters and stores the copy of the replacement IP address and/or the date and time the replacement IP address was received by the media device 110. A copy of the IP address 120 may be forwarded by a network access device 112 to the metering component 114. Alternatively, the network access device 112 may forward a copy of the replacement IP address to the collection system 102.

The metering component 114 may operate in the background of an operating system, applications, and/or hardware of the media device 110. Data gathered by the metering component 114 is sent or communicated to a processor and/or an event log within the memory of the media device 110. In another example implementation, the metering component 114 sends or communicates the metered data to a personal computer having a processor and memory that processes and stores the data. The personal computer may then transmit the data to the collection system 102 via the transmission medium 150.

The data includes usage information 122 and IP address information (e.g., IP addresses 120) for a plurality of time periods. The usage information 122 may include a log of applications and/or hardware functions accessed by a panel member, media device parametric information, and/or network parametric (e.g., quality) information. The data for a time period may be saved to the memory of the media devices 110 as part of an event log cache. The event log cache accumulates metered media device IP information and usage information 122 for a plurality of time periods. The metering component 114 within the media devices 110 transmits event logs including IP information from the media device 110 memory to the collection system 102. The media devices 110 may send the event logs and/or IP address information when the event log cache is full, when the collection system 102 sends a request or query to the media device 110, during predetermined times of a day or week, and/or when the media device 110 is in an idle state.

The usage information 122 collected by the metering component 114 includes any data relating to activity on the media device 110 initiated by a panel member. For example, the usage information 122 includes data from data applications, device applications, metadata, and event statistics. Data applications include, for example, Internet browsing, live media applications, mobile commerce transactions, mobile advertising activity, e-mail activity, etc. Device applications include, for example, games, address books, personal information management software, document processing programs, and media players used for streaming audio and video. Metadata includes attributes of device applications, for example, content title, author, date of publication, source and/or publisher information, copyright information, digital rights management information, etc. Event statistics includes, for example, voice and data call activity, text-messaging, instant messaging, etc.

The usage information 122 and received IP addresses 120 may be coupled to the time-based information 124 by the metering component 114. The time-based information 124 includes, for example, the duration of application usage, and calendar data (e.g., month, week, day, hour, minute, second). The time-based information 124 may enable the metering component 114 to follow a schedule of the time periods the metering component 114 is configured to monitor events on the media device 110.

Additionally, the metering component 114 collects any of the device identifiers 126 within the media device 110. The device identifiers 126 may include a brand, a model type, a hardware address, and/or a MAC address of the media device 110. Furthermore, the device identifiers 126 may include an alpha-numeric code provided to the panel member when their media device 110 is registered to a metering service. The collection system 102 may combine the device identifiers 126, the time-based information 124, and/or the IP addresses 120 together as IP address information that is used to associate demographic compositions to media devices.

The network access device 112 connects the media device 110 to the service provider 104 and/or the collection system 102 via the transmission medium 150. The media device 110 transmits IP address information (e.g., IP addresses and corresponding information) to the collection system 102 via a collected data bus 106. The network access device 112 converts the IP address information into a transportable format for transmission across the transmission medium 150. The conversion may include compressing the IP information and/or opening a transmission path via the transmission medium 150 to the collection system 102. The network access device 112 may operate on any type of wired and/or wireless network. A wired network may include an Ethernet connection, a digital subscriber line (DSL), a telephone line, coaxial cable, a cellular telephone system, etc. The wireless network may include a circuit switched network, a paging network, and/or packet-based data networks including, but not limited to, AMPS, CDMA, TDMA, GSM, iDEN, GPRS, 3XRTT, 3GSM, LTE, EDGE, WiMax, etc.

The network access device 112 may incorporate and adhere to wireless protocols and standards for data communication services through the transmission medium 150. These standards include TIA/EIA95-B (Mobile Base Station Compatibility for Wideband Spread Spectrum Cellular Systems), ANSI J-STD-008 (Personal Station-Base Station Compatibility Requirements for 1.8 to 2.0 GHz Code Division Multiple Access Personal Communication Systems), ANSI J-STD 018 (Minimum Performance Requirements for 1.8 to 2.0 GHz Code Division Multiple Access Personal Stations), TIA/EIA/IS-99 (Data Services Option Standard for Wideband Spread Spectrum Digital Cellular Systems), TIA/EIA-637-A (Short Message Service for Spread Spectrum Systems), TIA/EIA-683-A (Over-the-Air Provisioning of Mobile Stations in Spread Spectrum Systems), and various WAP documents (Wireless Application Protocol Architecture Specification, Wireless Application Environmental Specification, Wireless Telephony Application Specification, Wireless Transaction Protocol Specification, Wireless Datagram Protocol Specification, etc.).

The example network system 100 includes the transmission medium 150 for transporting IP address information from media devices 110, proxy servers 152, and/or service providers 104. The transmission medium 150 includes any hardware, software, computer readable medium, and/or physical connections between any media device capable of connecting to the transmission medium 150. For example, the transmission medium 150 may include a transport layer, an IP Multimedia Subsystem (IMS) layer, and an application layer. Within the transport layer, the transmission medium 150 may include digital subscriber line access multiplexers (DSLAMs), wireless local area network (WLAN) gateways, and/or general packet radio service (GPRS) support nodes for connecting a plurality of media devices. Additionally, the transport layer may include gateway GPRS support nodes (GSGNs), media resource function (MRF) servers, broadband access servers (BASs), switches, and/or routers for routing data between the media devices 110 and service providers 104 and/or the collection system 102. The transport layer within the transmission medium 150 may support Internet Protocol version 4 (IPv4), Internet Protocol version 6 (IPv6) and/or any other IP routing standard.

The IMS layer may include call session control function (CSCF) servers, communicatively coupled to home subscriber servers (HSSs) and/or application servers (ASs) in the application layer. Furthermore, the transmission medium 150 may be integrated with one or more service providers 104 and may route network traffic through any one of session border controllers, dynamic host configuration protocol (DHCP) servers, routers, and/or any other border elements included within the service providers 104. The data communicated via the transmission medium 150 may be formatted for any transmission protocol including, but not limited to session initiation protocol (SIP) and/or open service access (OSA). Furthermore, the transmission medium 150 may conform to any routing standards and/or specifications including third generation partnership project (3GPP) specifications and/or Internet engineering task force (IETF) specifications.

The transmission medium 150 includes the proxy server 152 for storing IP address information. The proxy server 152 collects IP address information for a plurality of media devices 110 in cases where some media devices 110 do not include a metering component 114 and/or where the media devices 110 are not capable of sending IP address information to the collection system 102. For example, when an IP address is assigned to the media device 110 by a DHCP server within the service provider 104, the IP address is sent to the media device 110 via a data connection 108. The proxy server 152 detects the IP address assignment and stores a copy of the IP address and the date and/or time the IP address was assigned to the media device 110. Additionally, the proxy server 152 may request the device identifier 126 from the media device 110 to associate the device identifier 126 with the stored IP address information. The proxy server 152 may detect IP address changes for a plurality of media devices 110 and store the IP address information for each media device.

Additionally, the proxy server 152 may detect Internet usage by the plurality of media devices and store the Internet usage information for each media device. The proxy server 152 may then send to the collection system 102 the stored IP address information and/or usage information for processing. The proxy server may send IP address information periodically to the collection system 102 or alternatively, upon request of the collection system 102.

The example proxy server 152 of FIG. 1 may be located in proximity to a session border controller and/or public DHCP servers within the transmission medium 150. In other example implementations, the proxy server 152 may be included within the service provider 104. Furthermore, the example proxy server 152 is shown in series with the data connection 108. Alternatively, the example proxy server 152 may monitor and/or probe the data connection 108 for Internet usage information.

The example service provider 104 includes any entity that enables one or more media devices to access the Internet, applications, servers, and/or services. The service provider 104 may include some or all of the hardware included within the transmission medium 150 for routing and directing Internet traffic. Additionally, the service provider 104 may include functionality to implement media gateways, signaling gateways and/or gateway controllers. The media gateways, signaling gateways and/or gateway controllers provide connectivity and interworking between VoIP and other circuit switch-based telephony networks (e.g., such as PSTN and/or pre-3G wireless networks). The service provider 104 may also include media servers to provide ring tones, announcements and/or media mixing for multi-way calling and/or other calling features. Furthermore, the service provider 104 may include DHCP servers for assigning the media device 110 a dynamic or a static IP address.

For media devices 110 that receive service from the service provider 104, the service provider 104 may collect and store IP address information and Internet usage information in the same manner as the proxy server 152 and/or the metering component 114. The service provider 104 may send the collection system 102 the IP address information and/or usage information for a plurality of media devices via connection 154. The service provider 104 may send the IP address information to the collection system 102 at time periods agreed upon by the two entities (i.e., the collection system 102 and the service provider 104) at periodic time periods, and/or upon request by the collection system 102.

The example collection system 102 receives and processes IP address information to associate media devices with geographic locations and/or demographic compositions. The collection system 102 may be operated by a metering entity that generates reports associating types of media devices with demographic profiles. The collection system receives the IP address information and/or media device usage information from one or more media devices 110, the proxy server 152, and/or one or more service providers 104. The collection system 102 receives the IP address information via the connection 154 and the collected data bus 106. The transmitted IP address information may be encrypted to secure the identity and personal information of users of the media devices 110.

The collection system 102 may include a group of servers in a central location for processing the IP address information or, alternatively, separate servers in different geographic locations. Servers in different geographic locations may collect IP address information for different regions and then forward the collected information to a central server for data processing and generating reports. Furthermore, the collection system 102 may include a computer, a server, a measurement entity, a processor, etc. Additionally, the collection system 102 may include a memory to store the IP address information, a processor to organize and filter the IP address information and an address resolver to associate demographic compositions with media devices. The collection system 102 includes databases for associating IP addresses with geographic locations and databases for associating demographic profiles with geographic locations. These databases enable the collection system 102 to associate a demographic profile (e.g., composition) with a media device.

While an example manner of implementing the network system 100 is depicted in FIG. 1, one or more of the interfaces, data structures, elements, processes and/or devices illustrated in FIG. 1 may be combined, divided, rearranged, omitted, eliminated and/or implemented in any other way. For example, the example collection system 102, the example media device 110, the example metering component 114, the example network access device 112, and/or the example transmission medium 150 illustrated in FIG. 1 may be implemented separately and/or in any combination using, for example, machine accessible or readable instructions executed by one or more computing devices and/or computing platforms (e.g., the example processing platform 1300 of FIG. 13). Further, the example collection system 102, the example media device 110, the example metering component 114, the example network access device 112, the example transmission medium 150, and/or more generally, the network system 100 may be implemented by hardware, software, firmware and/or any combination of hardware, software and/or firmware. Thus, for example, any of the example collection system 102, the example media device 110, the example metering component 114, the example network access device 112, the example transmission medium 150, and/or more generally, the network system 100 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example collection system 102, the example media device 110, the example metering component 114, the example network access device 112, and/or the example transmission medium 150 are hereby expressly defined to include a tangible medium such as a memory, DVD, CD, etc. storing such software or firmware. Further still, the example network system 100 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors.

Figure 2:
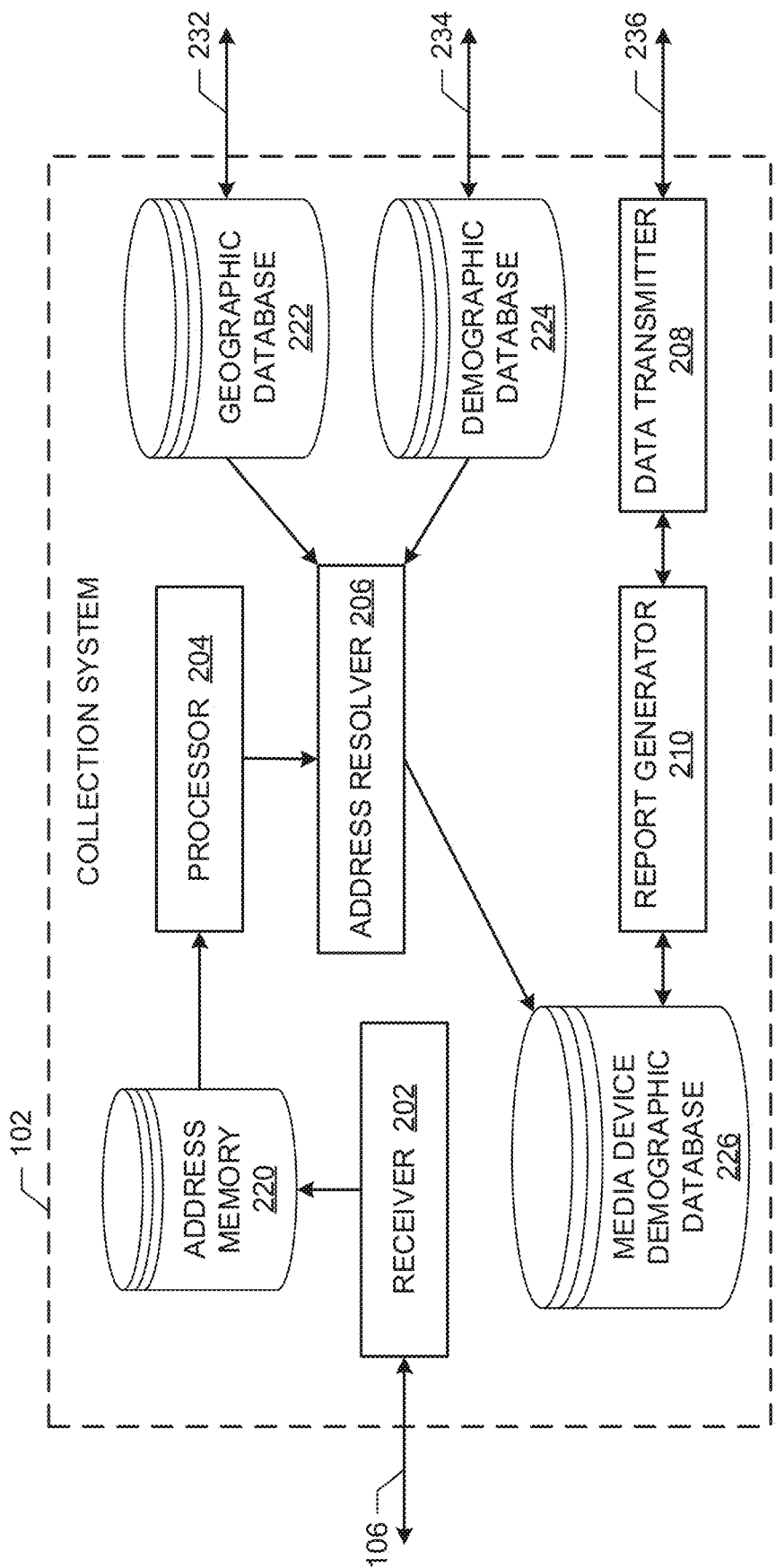
FIG. 2 shows an example implementation of the example collection system of FIG. 1.

FIG. 2 shows the example collection system 102 of FIG. 1 in greater detail. The collection system 102 includes a receiver 202, an address memory 220, a processor 204, an address resolver 206, a data transmitter 208, a report generator 210, a geographic database 222, a demographic database 224, and a media device demographic database 226. The example collection system 102 receives and processes IP address information to associate media devices with geographic locations and/or demographic compositions. The collection system 102 may be operated by a metering entity that generates reports summarizing types of media device associated with demographic profiles.

The example receiver 202 receives IP address information from media devices 110, the proxy server 152 and/or the service provider 104 of FIG. 1. The IP address information is received via the collected data bus 106. The receiver 202 may receive IP address information and/or media device usage information from the media devices 110, the proxy server 152, and/or the service provider 104 at predetermined time periods. Alternatively, the receiver 202 may request the IP address information from the media devices 110, the proxy server 152, and/or the service provider 104. Furthermore, the receiver 202 may filter and format the IP address information for processing in the collection system 102.

The example receiver 202 of FIG. 2 may request hardware identification information (e.g., MAC addresses) from the media devices 110. Upon receiving hardware identification, the receiver 202 associates the hardware identification with IP address information from the corresponding media device. Then, after receiving the IP address information, the receiver 202 sends the IP address information to the address memory 220. For example, the receiver 202 may receive IP address information including IP addresses and the dates and/or times the IP addresses were assigned to the media device 110. Additionally, the IP address information includes the currently assigned IP address of the media device 110 used in the transmission of the IP address information. The receiver 202 uses the currently assigned IP address to send a request message back to the media device 110. Upon receiving the request message, the media device responds by sending its hardware identification (e.g., the device identifier 126) to the receiver 202. The receiver 202 receives the hardware identification, associates the hardware identification with the IP address information, and sends the information to the address memory 220.

The example address memory 220 stores IP address information and the corresponding media device identification information. Additionally, the address memory 220 may store the media device usage information 122. The address memory 220 may organize the IP address information by media device identification, by the chronological time at which the IP address information was received by the receiver 202, by IP address number, and/or any other method specified by an operator of the collection system 102.

The address memory 220 may be implemented by a read-only memory (ROM) and/or a random access memory (RAM). Additionally, the media device demographic database 226, geographic database 222, and/or the demographic database 224 may be implemented by ROM and/or RAM. The RAM may be implemented by, for example, dynamic random-access memory (DRAM), synchronous dynamic random-access memory (SDRAM), and/or any other type of RAM device(s). The ROM may be implemented by, for example, flash memory(-ies) and/or any other desired type of memory device(s). Access to the address memory 220, the media device demographic database 226, the geographic database 222, and/or the demographic database 224 may be controlled by a memory controller (not shown).

The example address memory 220 stores IP address information until the IP address information is requested by the processor 204. In other example implementations, the address memory 220 may send the processor 204 IP address information at predetermined time periods specified by an operator of the collection system 102 and/or when the amount of IP address information reaches a predetermined threshold. For example, the address memory 220 may send the processor 204 IP address information after storing IP address information for 1000 media devices.

The example processor 204 filters and/or configures the IP address information for the address resolver 206. The filtering by the processor 204 enables the collection system 102 to process IP address information for specific criteria. This enables the creation of reports based on the specific criteria. The criteria for filtering IP address information may include filtering by IP address number, type of media device, time period, media device identification, and/or by any other criteria specified by an operator of the collection system 102. The IP address information filtered out by the processor 204 may be returned to the address memory 220 and/or discarded. For example, the processor 204 may be configured to filter and retrieve all IP address information corresponding to Aug. 1, 2008 through Aug. 30, 2008. The IP address information during this time period is forwarded to the address resolver 206 while IP address information corresponding to times/dates before August may be discarded and IP address information corresponding to after August is returned to the address memory 220. This filtered IP address information enables the collection system 102 to generate media device demographic composition reports based on the data collected corresponding to the month of August.

The filtering criteria used by the processor 204 may change periodically and/or in response to instruction from an operator of the collection system 102. Additionally, the processor 204 may filter and/or configure the IP address information itself. For example, the processor 204 may combine IP address information for a common media device, may calculate a total time from a start time and a stop time, may calculate total bandwidth usage for a time period, may filter media device usage information, etc. An example table showing filtered IP address information is described in conjunction with FIG. 4.

The processor 204 may retrieve IP address information from the address memory 220 at predetermined time periods and/or upon request from an operator of the collection system 102. Alternatively, the address memory 220 may send the processor 204 the IP address information. Upon filtering and processing the IP address information, the processor 204 sends the processed IP address information to the address resolver 206.

In addition to any number and/or type(s) of specialized hardware, firmware and/or logic to perform processing functions, the example processor 204 of FIG. 2 includes any number and/or type(s) of specialized and/or general purpose controller(s) and/or processing unit(s) capable of executing coded instructions. For example, the controller and/or processing unit may perform any number and/or type(s) of processing functions by carrying out and/or executing coded instructions present in a memory communicatively coupled and/or within the processor 204 (e.g., within a random-access memory (RAM), a read-only memory (ROM) and/or on-board memory of the processor 204).

The example address resolver 206 determines a most used IP address from the IP address information for each media device. Then, the address resolver 206 uses the most used IP address for each media device to associate a geographic location and/or demographic composition with each media device. The address resolver 206 receives filtered and/or processed IP address information from the processor 204. The IP address information for a single media device includes the media device identification, IP addresses assigned to the media device, the time periods the IP addresses were assigned, bandwidth utilized by the media device, and/or any media device usage information. In other example implementations, the address resolver 206 may include individual functional blocks for determining a most used IP address, for associating a geographic location with an IP address, and/or for associating a demographic profile with an IP address.

Upon receiving the IP address information, the address resolver 206 may process the IP address information in parallel for all the media devices listed in the IP address information or, alternatively, may process the IP address information serially for each media device. The address resolver 206 selects IP address information for a single media device and determines the most used IP address for the media device for the time period of the IP address information. For example, when provided with IP address information for the month of August, the address resolver 206 selects all IP address information with media device identification of MAC01 to determine the most used IP address for the MAC01 media device during the month of August.

The most used IP address may be determined by calculating which of the plurality of IP addresses assigned to the media device utilized the most bandwidth, by which of the plurality of IP addresses assigned to the media device were used to access the Internet for the longest time period, and/or by which of the plurality of IP addresses were assigned to the media device for the longest time period. Additionally, the determination method of the most used IP address may be specified by an operator of the collection system 102.

Determining the most used IP address provides a confidence level that the data generated in the marketing reports reflects the home location of the media device user. For example, a traveling salesperson may work or use a media device from a home location three days a week and travel to out-of-town client sites four days a week. Assuming a new IP address is assigned to the media device at each client site, the most used IP address corresponds to the salesperson's home location. Thus, demographic information associated with the media device is correctly applied based on the demographics of the home location and not the demographics associated with the client sites.

Upon determining the most used IP address for the media device, the address resolver 206 associates the most used IP address with a geographic location. The address resolver 206 determines the geographic location by accessing the geographic database 222 and matching the most used IP address to a geographic location. The geographic database 222 includes lists of IP addresses and/or IP address prefixes cross-referenced to geographic locations. The lists of IP addresses and geographic locations (e.g., Geo-IP information) is supplied to the geographic database 222 via communication link 232, which communicatively couples the geographic database 222 to any one of a propriety, commercial, and/or public Geo-IP address database. Commercial databases may include Maxmind®, HostIP, Geobytes, etc. The geographic database 222 may update the Geo-IP information at predetermined time periods and/or upon request from an operator of the collection system 102.

The address resolver 206 matches the most used IP address to a geographic location by either finding the exact IP address in the geographic database 222 or, alternatively, by matching a prefix of the most used IP address to a prefix and/or an IP address range within the geographic database 222. For example, if the most used IP address is 216.146.64.2, the address resolver 206 may match the 216 prefix to a 216 prefix and/or to a range of IP address prefixes that includes 216 in the geographic database 222. Additionally, the address resolver 206 may then match the 146 prefix of the most used IP address to the corresponding second prefix in the 206 IP address and/or range of IP addresses in the geographic database 222.

When the address resolver 206 determines the most used IP address is matched to an IP address prefix and/or IP address in the geographic database 222, the address resolver 206 associates the corresponding geographic location to the most used IP address and/or the media device 110. The associated geographic location may include a county, a state, a region, a city, a town, a zip code, a block, a latitude, and/or a longitude. The resolution of geographic location may depend on the specificity of geographic location information in the geographic database 222. For example, the address resolver 206 may only resolve an IP address to a city, while in another example the address resolver 206 may resolve an IP address to a block within a city. An example table with media devices associated with geographic locations is shown in FIG. 5.

In cases when a most used IP address is owned by the service provider 104 and shows an address of the service provider 104, the address resolver 206 may only resolve a geographic location to the general area of the location of the service provider 104. For example, a media device user located in a zip code of 60074 subscribes to the service provider 104 located in zip code 60010. Because the IP address is owed by the service provider 104, the data in the geographic database 222 provided by Geo-IP commercial databases show the IP address having a location at the 60010 zip code. As a result, the address resolver 206 associates the 60010 zip code to the media device user living in the 60074 zip code. The two zip codes may correspond to different demographic compositions, thus skewing the usage results to the locations of the service providers 104.

To alleviate incorrect address resolution, the address resolver 206 may determine if the most used IP address corresponds to a service provider 104 and, if so, increase the size of the geographic location to include the media device user. The size increase of the geographic location may come from data from service providers 104 specifying the average distance between media device users and the service provider 104 location. Alternatively, the location of the media device user can be inferred by determining the locations of the routers, switches, and/or border controllers used in routing the IP address information from the media device of the user through the transmission medium 150 to the collection system 102. Furthermore, the address resolver 206 may determine that an IP address corresponds to the location of the service provider 104 by checking the number of IP addresses that may correspond to the same address. For example, if the address resolver 206 determines 650 out of 1000 IP addresses are associated with the same street address, the address resolver 206 may associate the IP address to a more general geographic location covering likely geographic locations of media devices users.

By determining the geographic location of a most used IP address of a media device, the address resolver 206 then associates a demographic profile (e.g., composition) with the media device. The demographic profile for a media device is determined by accessing the demographic database 224 and matching the geographic location associated with the most used IP address to a geographic location in the demographic database 224. The demographic database 224 includes lists of geographic locations cross-referenced with demographic profiles for each of the listed geographic locations. The demographic profiles may include information relating to race, ethnicity, education level, adjusted gross income per household, number of members per household, gender, population, etc. Additionally, the demographic profile may include a representation of average demographics and/or a listing of demographic information for the corresponding geographic location.

The lists within the demographic database 224 are updated via communication link 234, which communicatively couples the demographic database 224 to any one of a propriety, commercial, and/or public geographic-demographic database. Commercial databases may include Nielsen Claritas, PRIZM, GeoLytics, DemographicsNow, etc. The demographic database 224 may update the geographic-demographic information at predetermined time periods and/or upon request from an operator of the collection system 102.

The address resolver 206 matches the media device 110 to a demographic profile by matching geographic locations. For example, in a case where a most used IP address is associated with a zip code 60607, the address resolver 206 accesses the demographic database 224 and searches for a geographic location corresponding to 60607. This may include an exact zip code match in the demographic database 224 or, alternatively, a match to a range of zip codes and/or a more general geographic area (e.g., West Loop of Chicago). The resolution of demographic profile to a geographic area may depend on the specificity of geographic-demographic location information in the geographic database 222. For example, the address resolver 206 may only resolve demographic profiles to a city, while in another example, the address resolver 206 may resolve a demographic profile to a block within a city.

Upon matching the geographic location associated with the media device 110 to a geographic location within the demographic database 224, the address resolver 206 associates the demographic information corresponding to the matched geographic location with the media device 110. Associating may include linking the demographic information to a record that includes the media device 110 and its most used IP address. Alternatively, the address resolver 206 may link a code corresponding to the demographic profile to a record including the media device 110. An example table having media devices associated with geographic locations and demographic profiles is shown in FIG. 6.

The address resolver 206 transmits the IP address information including the media device identification, the most used IP address, the associated demographic profile, the associated geographic location, and/or media device usage information to the media device demographic database 226. The address resolver 206 may transmit the IP address information upon associating a demographic profile with a media device or, alternatively, upon associating a group of media devices to demographic profiles. An operator of the collection system 102 may specify when the address resolver 206 transmits IP address information and associated demographic profiles to the media device demographic database 226.

The media device demographic database 226 stores information associating media devices to demographic information for generating summary reports. The information may be in record form with a line for each media device including its most used IP address, an associated geographic location, and/or an associated demographic profile. The media device demographic database 226 may organize and/or compile the information by media device identification, by type of media device, by geographic location, by demographic information, and/or by time periods. Additionally, an operator of the collection system 102 may specify the organization of the media device demographic database 226.

The example report generator 210 generates reports from the compiled and organized information in the media device demographic database 226. The criteria for each report may be determined by an operator of the collection system 102 or, alternatively, the report generator 210 may generate reports for predefined media device types, geographic locations, and/or demographic profiles. Additionally, reports may be generated associating media device usage information for types of media devices with geographic locations and/or demographic profiles.

Additionally, the report generator 210 may calculate market statistics from the sample IP address information. For example, the total market usage of media devices for a geographic region can be calculated by compiling the sample IP address information associated with the geographic region and counting the number of media devices for each model. Then, the number of media devices per model is compared to the total population of the entire region and the total number of people using each type of media device is estimated. Market usage values can be calculated by device type, by application type, and/or by demographic profile for each type of media device for specific geographic areas.

The report generator 210 may also combine data for smaller geographic locations (e.g., zip codes) into larger geographic regions (e.g., a city). The combining of geographic locations may be useful for reports covering general geographic areas. The IP address information with the associated demographic profiles ensures that if geographic regions are combined, the demographic profiles resulting from the combination are averaged by media device usage. Alternatively, the report generator 210 may access the demographic database 224 and associate the larger geographic region to a demographic profile corresponding to a similar geographic location in the demographic database 224.

Furthermore, the report generator 210 may correlate demographic data from areas of high media device usage to areas where the media device usage may not be accurately captured by the demographic data. For example, in zip code 60074, a minority of sampled individuals may use media device A and have a demographic profile of XYZ. However, the majority of sampled individuals in the 60074 zip code may have a demographic profile of MNO. These MNO users may use media device B predominantly. The report generator 210 can compare the usage of the media device A to geographic locations with similar XYZ demographic profiles and determine if the media device usage is proportional. If there is a correlation, the report generator 210 may associate the media device A with the XYZ demographic profile.

The reports generated in the report generator 210 may be used by media device manufacturers, marketing entities, application developers, media device service providers, third party statistical agencies, and/or any other interested party. Each report may be tailored to the party receiving the report. For example, a report for media device manufacturers may include total sampled numbers of types of media devices for a geographic location, market estimates of the total numbers of each type of media device in the geographic location, and/or the demographic profile for each type of media device in the geographic location. The media device manufacturers may use this information for planning distribution channels, adding design improvements for different types of users, etc. Examples of reports are shown in FIGS. 5 and 6.

The example data transmitter 208 of FIG. 2 transmits the generated reports via communication link 236 to media device manufacturers, marketing entities, application developers, media device service providers, third party statistical agencies, and/or any other interested party. The data transmitter 208 may send reports compiled in the report generator 210 in response to a request from an operator of the collection system 102, at predefined time periods, and/or upon generation of the reports.

While an example manner of implementing the collection system 102 is depicted in FIG. 2, one or more of the interfaces, data structures, elements, processes and/or devices illustrated in FIG. 2 may be combined, divided, rearranged, omitted, eliminated and/or implemented in any other way. For example, the example receiver 202, the example processor 204, the example address resolver 206, the example media device demographic database 226, the example geographic database 222, the example demographic database 224, the example report generator 210 and/or the example data transmitter 208 illustrated in FIG. 2 may be implemented separately and/or in any combination using, for example, machine accessible instructions executed by one or more computing devices and/or computing platforms (e.g., the example processing platform 1300 of FIG. 13). Further, the example receiver 202, the example processor 204, the example address resolver 206, the example media device demographic database 226, the example geographic database 222, the example demographic database 224, the example report generator 210, the example data transmitter 208, and/or more generally, the example collection system 102 may be implemented by hardware, software, firmware and/or any combination of hardware, software and/or firmware. Thus, for example, any of the example receiver 202, the example processor 204, the example address resolver 206, the example media device demographic database 226, the example geographic database 222, the example demographic database 224, the example report generator 210, the example data transmitter 208, and/or more generally, the collection system can be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended claims are read to cover a purely software or firmware implementation, at least one of the example receiver 202, the example processor 204, the example address resolver 206, the example media device demographic database 226, the example geographic database 222, the example demographic database 224, the example report generator 210 and/or the example data transmitter 208 are hereby expressly defined to include a tangible medium such as a memory, DVD, CD, etc. storing such software or firmware. Further still, the example collection system 102 may include additional devices, servers, systems, networks, gateways, portals, and/or processors in addition to, or instead of, those illustrated in FIG. 2 and/or may include more than one of any or all of the illustrated devices, servers, networks, systems, gateways, portals, and/or processors.

Figure 3A:
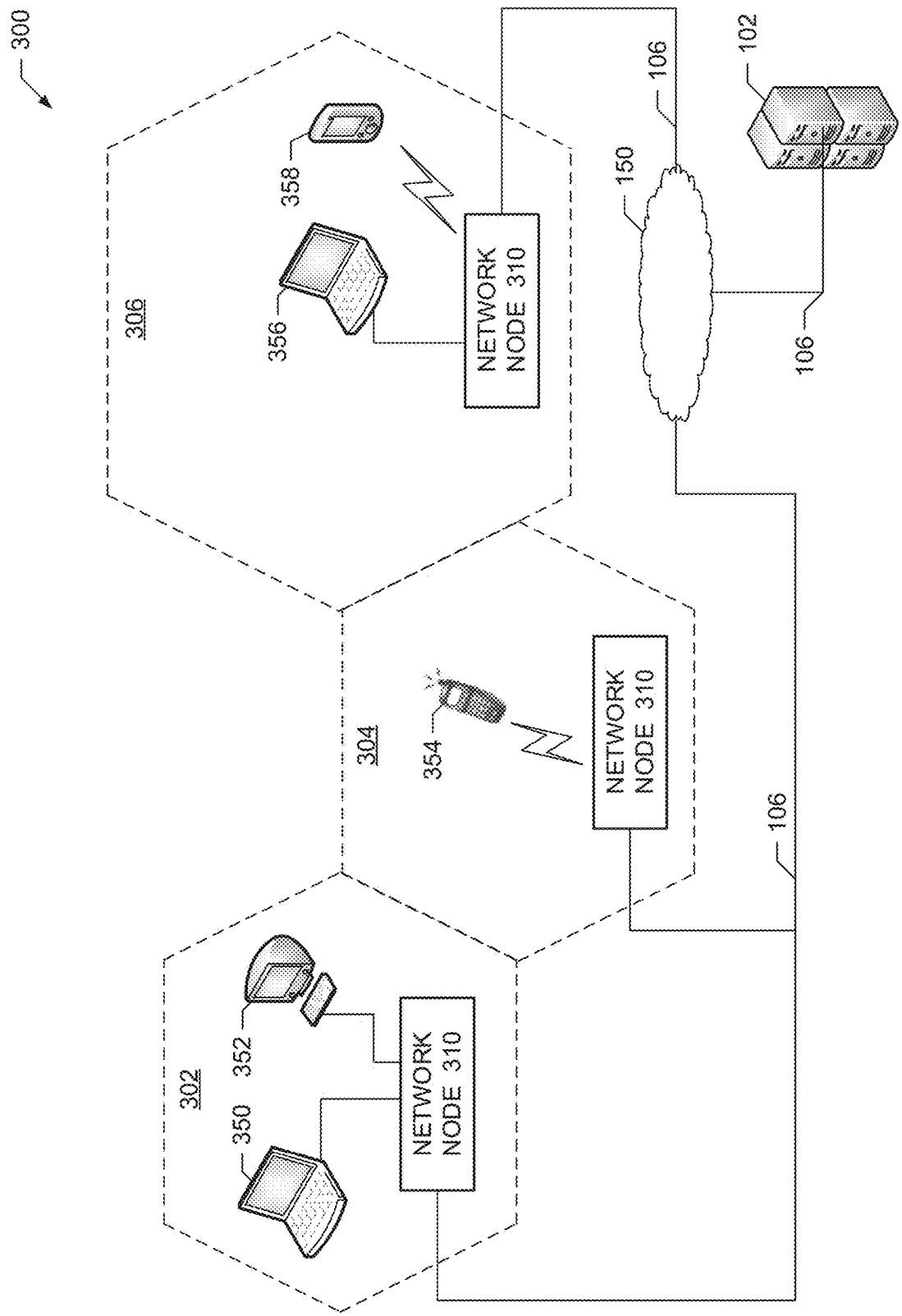
FIG. 3A shows an example communication system during a first time period with media devices in different geographic regions.

FIG. 3A shows an example network system 300 during a first time period with media devices 350-358 in different geographic regions 302-306. The example network system 300 includes the transmission medium 150, the collected data bus 106, and the collection system 102 of FIG. 1. In the example network system 300 of FIG. 3A the service provider 104 and the data connection 108 are included within the transmission medium 150 and the geographic regions 302-306. The geographic regions 302-306 may each correspond to respective zip codes, cities, towns, regions, states, etc. The example network system 300 shows only a small sample of media devices 350-358 that may be included within each of the respective geographic regions 302-306. The example media devices 350-358 are within their home locations.

Each geographic region 302-306 includes a network node 310 for communicatively coupling each media device 350-358 to the transmission medium 150. In some example implementations, the network nodes 310 may be included within the transmission medium 150 and/or may be associated with the service provider 104. The network nodes 310 include wired connections and/or wireless connections to the respective media devices 350-358. The network nodes 310 may be implemented to modulate and transmit reference, data, control signals, and/or symbols in accordance with one or more past, present and/or future wired and/or wireless communication standards and/or specifications, such as the Evolved Universal Terrestrial Radio Access (EUTRA) specification currently being defined by Third Generation Partnership Project (3GPP) Technical Study Group (TSP) Radio Access Networks (RAN) Working Group 1 (WG1).

A wired network may include an Ethernet connection, a digital subscriber line (DSL), a telephone line, coaxial cable, a cellular telephone system, etc. The wireless network may include a circuit switched network, a paging network, and/or packet data networks including, but not limited to, AMPS, CDMA, TDMA, GSM, iDEN, GPRS, 3XRTT, 3GSM, LTE, EDGE, WiMax, etc.

The collection system 102 receives copies of IP addresses assigned to each of the media devices 350-358. Additionally, the collection system 102 receives the dates and times the IP addresses were assigned to the respective media devices 350-358, hardware identification (e.g., a MAC address) of the media devices 350-358, and/or media device usage information. In the example network system 300, the media devices 350 and 352 send the collection system 102 IP addresses corresponding to the geographic region 302, media device 354 sends the collection system 102 IP addresses corresponding to the geographic region 304, and the media devices 356 and 358 send the collection system 102 IP addresses corresponding to the geographic region 306.

Figure 3B:
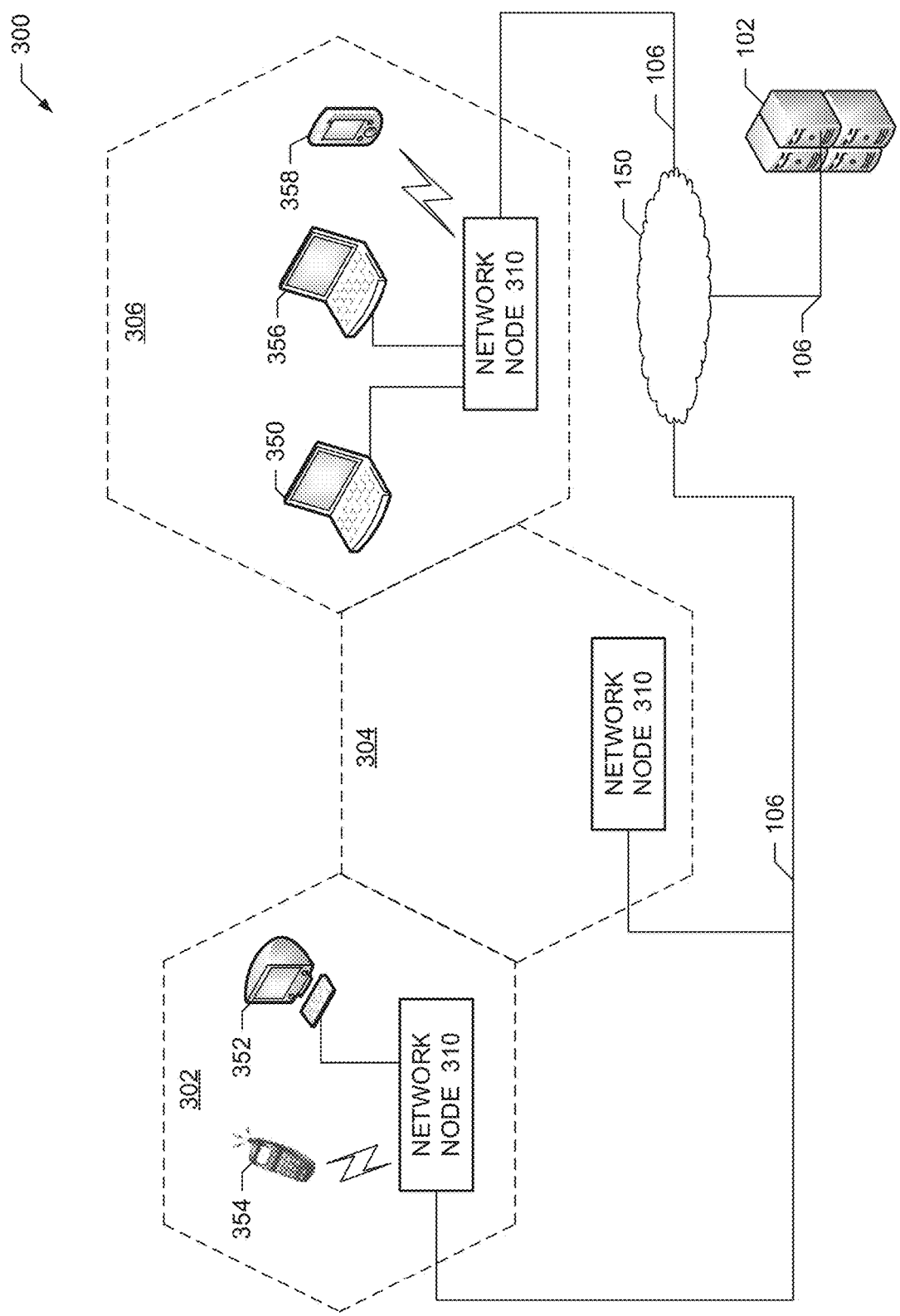
FIG. 3B shows the example communication system of FIG. 3A during a second time period with some of the media devices moving to different geographical regions.

FIG. 3B shows the same media devices 350-358 in the same network system 300 as FIG. 3A during a second time period. Additionally, the transmission medium 150, the collection system 102, the network nodes 310 and the collected data bus 106 are the same as in FIG. 3A. The length of time in the second time period is less than the length of time of the first time period. From the first time period to the second time period media device 350 moved to the geographic region 306 and the media device 354 moved to the geographic region 302.

Upon moving to the geographic region 306, the media device 350 is assigned an IP address corresponding to the geographic region 306 and upon moving to the geographic region 302 the media device 354 is assigned an IP address corresponding to the geographic region 302. Thus, the media device 350 sends the collection system 102 a copy of the IP address corresponding to the geographic region 306 and the media device 354 sends the collection system 102 a copy of its newly assigned IP address corresponding to the geographic region 302.

The collection system 102 processes the IP address information from the media devices 350-358. Despite the media devices 350 and 354 changing geographic regions, the collection system 102 associated the media devices 350 and 354 with their respective home locations because the first time period is longer than the second time period. Thus, the most used IP address of the media device 350 and 354 corresponds to the IP address assigned to the media devices 350 and 354 during the first time period in FIG. 3A. This enables the collection system 102 to associate the demographic profile corresponding with the home geographic region of the media devices 350 and 354.

FIG. 4 shows a table 400 of example IP address information from two media devices, MAC01 and MAC02. The media devices are similar and/or identical to the media device 110 described in conjunction with FIG. 1. The table 400 is representative of IP address information that may be stored in the address memory 220 of the collection system 102. The IP address information may have been sent from the respective media devices, from the proxy server 152, and/or from respective service providers 104 of the media devices.

The example table 400 includes fields for a media device identification (DEVICE ID), an IP address (IP ADDRESS), a start time for the respective IP address (START TIME), a stop time for the respective IP address (STOP TIME), and bandwidth (BANDWIDTH) utilization during the time between the START TIME and the STOP TIME. The table 400 may include additional fields for media device usage information, panel member identification, media device identification, and/or any other information specified by an operator of the collection system 102. The DEVICE ID field includes a MAC address, a hardware identifier, and/or any other device identification value. In the example implementation, each media device includes a unique identifier such that no two media devices have the same identification. The IP ADDRESS field includes the IP address assigned to the media device in the DEVICE ID field, the time the IP address was received by the media device in the START TIME field, and the time the IP address was replaced by a replacement IP address in the STOP TIME field. Additionally, the bandwidth utilized by the media device for the time period is shown in the BANDWIDTH field. For example, the MAC01 media device was assigned three IP addresses (i.e., IP ADDR 02, IP ADDR 23, IP ADDR 16) from the time period 8/1/08-8/31/08. The IP address IP ADDR 02 was assigned to the MAC 01 media device from 7:30 AM on 8/1/08 through 9:15 AM on 8/15/08. During this time period, the media device utilized 135 MB of bandwidth.

The IP address information in the example table 400 is processed by the collection system 102. The collection system 102 may process all IP address information corresponding to one or more media devices. For example, the collection system 102 may process all IP address information corresponding to the media device MAC01 before processing the IP address information corresponding to MAC02. Additionally, the collection system 102 may organize the IP address information in the example table 400 by media device identification, media device type, time period, and/or any other criteria specified by an operator of the collection system 102.

Each row in the example table 400 may have been a separate transmission of IP address information or, alternatively, the data may have been received by the collection system 102 at one time. While only two media devices are shown in table 400, the table 400 may include additional media devices. Furthermore, the example table 400 may include additional time periods and the corresponding bandwidth usage.

FIG. 5 shows a table 500 of the most used IP addresses from the two media devices, MAC01 and MAC02 from FIG. 4 linked to example geographic locations. The table 500 is representative of IP address information processed by the address resolver 206 of FIG. 2. The example table 500 shows the most used IP address for each media device as calculated from the IP address information in the example table 400 of FIG. 4. Additionally, the example table 500 includes fields for geographic location information such as, for example, REGION, CITY, ZIP CODE, BLOCK, LATITUDE, and LONGITUDE.

In this example, the most used IP address was determined by calculating which IP address was assigned to the media device for the longest period of time. For the media device MAC01, the most used IP address was IP ADDR 02 and for the media device MAC02, the most used IP address was IP ADDR 67. In other example implementations, the most used IP address may be calculated by determining which of the plurality of IP addresses each media device used to access the Internet for the longest period of time and/or which of the IP addresses each media device utilized the most bandwidth.

Upon determining the most used IP address, the address resolver 206 associates a geographic location with the most used IP address for each media device. The address resolver 206 may access a geographic database 222 that includes Geo-IP address lookup information from any propriety, commercial, and/or public Geo-IP address database. Upon accessing the geographic database 222, the address resolver 206 matches the most used IP address for each device to a geographic location. The example table 500 shows the two media devices with their respective most used IP addresses, IP address information, and associated geographic locations.

For example, the media device MAC01 is associated with a region of Southern California, a city of Los Angeles, a zip code of 90015, a block of 1111 S. Figueroa St., a latitude of 34.042579, and a longitude of −118.267565. Likewise, media device MAC02 is associated with a region of Northern Illinois, a city of Chicago, a zip code of 60606, a block of 100 S. Wacker Dr., a latitude of 41.879598, and a longitude of −87.637677. In other example implementations, such as when an IP address is owned by a service provider 104, the associated geographic location may only resolve to a region, a city, and/or a zip code.

While only two media devices are shown in table 500, the table 500 may include additional media devices. Furthermore, the example table 500 may include more fields for geographic location information or alternatively, fewer fields for geographic information.

FIG. 6 shows an example table 600 with the most used IP addresses from the table 500 in FIG. 5 associated with example demographic profile data. The table 600 is compiled from the address resolver 206 accessing the demographic database 224 of FIG. 2. The demographic database 224 includes a listing of geographic locations and demographic profiles associated with each geographic location. The geographic locations in the demographic database 224 may be listed by zip codes, city, region, etc. In the example of FIG. 6, the demographic profiles are associated with zip codes. The demographic database 224 may include geographic-demographic lookup information from any public, commercial, and/or propriety database such as, for example, Nielsen Claritas.

The example table 600 includes fields for demographic profiles such as, for example, POPULATION, GENDER MEDIAN AGE, HOUSEHOLD SIZE, AGI (Adjusted Gross Income), TOP 3 RACES, and COLLEGE DEGREE. Additionally, the table 600 may include fields for other types of demographic information. The POPULATION field shows the population of a geographic location. The GENDER field shows a percentage of males living in a geographic location. The MEDIAN AGE field shows a media age of a population and a household size shows an average number of people per residence in a geographic location. The AGI field shows an average adjusted gross income for a population in a geographic location. The TOP 3 RACES field shows top 3 races or ethnicities for a geographic location. The COLLEGE DEGREE field shows what percentage of a population of a geographic location has obtained a college degree. In other examples, the information within each of the demographic fields may include a distribution of demographic data, an average profile or atypical member, or a listing of the top 3-5 demographic compositions for a geographic location.

To create the data association shown in table 600, the address resolver 206 matches a geographic location of a most used IP address to a zip code and/or a range of zip codes in the demographic database 224. For example, the MAC01 media device with the most used IP address of IP ADDR 02 is associated with the geographic location 90015 shown in FIG. 5. The address resolver 206 matches the 90015 zip code to the 90015 zip code listed in the demographic database. Upon matching the zip codes, the address resolver 206 associates the demographic profile corresponding to the 90015 zip code with the MAC01 media device shown in table 600 of FIG. 6.

In other example implementations, the address resolver 206 may match geographic regions, cities, and/or a latitude and a longitude to a similar specified location in the demographic database. While only two media devices are shown in table 600, the table 600 may include additional media devices. Additionally, the table 600 may be organized by geographic locations, by media device types, and/or any other organization specified by an operator of the collection system 102. Furthermore, the example table 600 may include a field for a demographic profile code that corresponds to a demographic profile in the demographic database 224.

FIG. 7 shows an example report 700 of example demographic profiles for three different types of media devices in two geographic zip codes. The report 700 may be generated by the collection system 102 upon associating demographic profiles with media devices. The report 700 includes fields for the media device type (i.e., DEVICE TYPE), geographic location (i.e., ZIP CODE), number of sampled media devices per device type and location (i.e., NUMBERED OF SAMPLED DEVICES) and demographic information (e.g., POPULATION—COLLEGE DEGREE). The report 700 is generated by compiling media devices of the same type for a geographic location. Because the geographic location is constant, the demographic profile for the geographic location is the same.

The example report 700 may provide media device manufacturers, marketing entities, and/or any other interested party a typical demographic composition for different models of media devices for a geographic location. Additionally, the number of sampled devices may provide an estimate of the market penetration of each media device type. For example, the report 700 shows that DEVICE TYPE 1 is used by more people in the 90015 zip code than DEVICE TYPE 2 or DEVICE TYPE 3. In other example implementations, the report 700 may include additional demographic profile fields, fewer demographic profile fields, additional device usage information, and/or additional geographic information. For example, a device usage field may include the most used applications on per media device type. Furthermore, the example report 700 may include a field for estimated total number of media devices used in a geographic location. While the example report 700 shows three device types for two geographic areas, other reports may include more device types and additional geographic locations.

FIG. 8 shows an example report 800 of example demographic profiles for three different types of media devices in two geographic regions. The report 800 may be generated by the collection system 102 of FIG. 2 upon associating demographic profiles with media devices. The report 800 includes fields for the media device type (i.e., DEVICE TYPE), geographic location (i.e., REGION), number of estimated media devices per device type and location (i.e., ESTIMATED NUMBER OF USERS), and demographic information (e.g., GENDER—COLLEGE DEGREE).

The example report 800 is generated by compiling media devices of the same type for a geographic location. Because the geographic location is a region, the demographic profiles associated with the zip codes are averaged together for the region. For example, the Northern IL region may include demographic profiles for zip codes including 60606, 60607, 60654, 60010, 60074, 60047, etc. By averaging the demographic profiles for each zip code, sampling weights may be included in the averaging calculation such that the most likely demographic profile of a user is more likely to be calculated than an average of demographic profiles across a region. For example, if a media device is heavily used in a zip code with a first demographic profile, but lightly used in a zip code with a larger population with a second demographic profile, a calculation with weighted usage would average to a demographic profile similar to the first demographic profile. Alternatively, the demographic profile for each region may be loaded from the demographic database 224.

The example report 800 may provide media device manufacturers, marketing entities, and/or any other interested party with typical demographic data for each device type in a geographic location. Additionally, the example report 800 provides an estimate of the total number of users in each geographic location who may own a media device. The estimate is based on processed sample data collected by the collection system 102. For example, in NORTHERN IL, DEVICE TYPE 1 may be used by 1274 individuals, where the average user in NORTHERN IL of the DEVICE TYPE 1 is 29.4 years old with an AGI of 75,290. A marketing entity may use this information for targeted marketing for this demographic profile in this geographic location. In some cases a minority in a geographic region may not be accurately represented by a typical demographic profile for the geographic location. In these cases, the collection system 102 may correlate demographic profiles in geographic locations where usage of a media device model is higher to geographic areas where the same media device is lower.

In other example implementations, the report 800 may include additional demographic profile fields, fewer demographic profile fields, additional device usage information, and/or additional geographic information. For example, a device usage field may include the most used applications on the media devices. While the example report 800 shows three device types for two geographic regions, other reports may include more device types and additional geographic locations.

FIGS. 9, 10, 11, and 12 are flowcharts representative of example methods that may be executed for associating media devices with a demographic composition of a geographic area. The example methods may be executed using, for example, a processor system such as the system 1300 of FIG. 13. However, one or more of the blocks depicted in the flowcharts may be implemented in any other manner, including by dedicated purpose circuitry, manual operations, etc. Additionally, although the example methods are described with reference to the flowcharts of FIGS. 9, 10, 11, and 12, other methods for associating media devices with a demographic composition of a geographic area may additionally or alternatively be used. For example, the order of execution of the blocks depicted in the flowcharts of FIGS. 9, 10, 11, and 12 may be changed, and/or some of the blocks described may be rearranged, eliminated, or combined.

Figure 9:
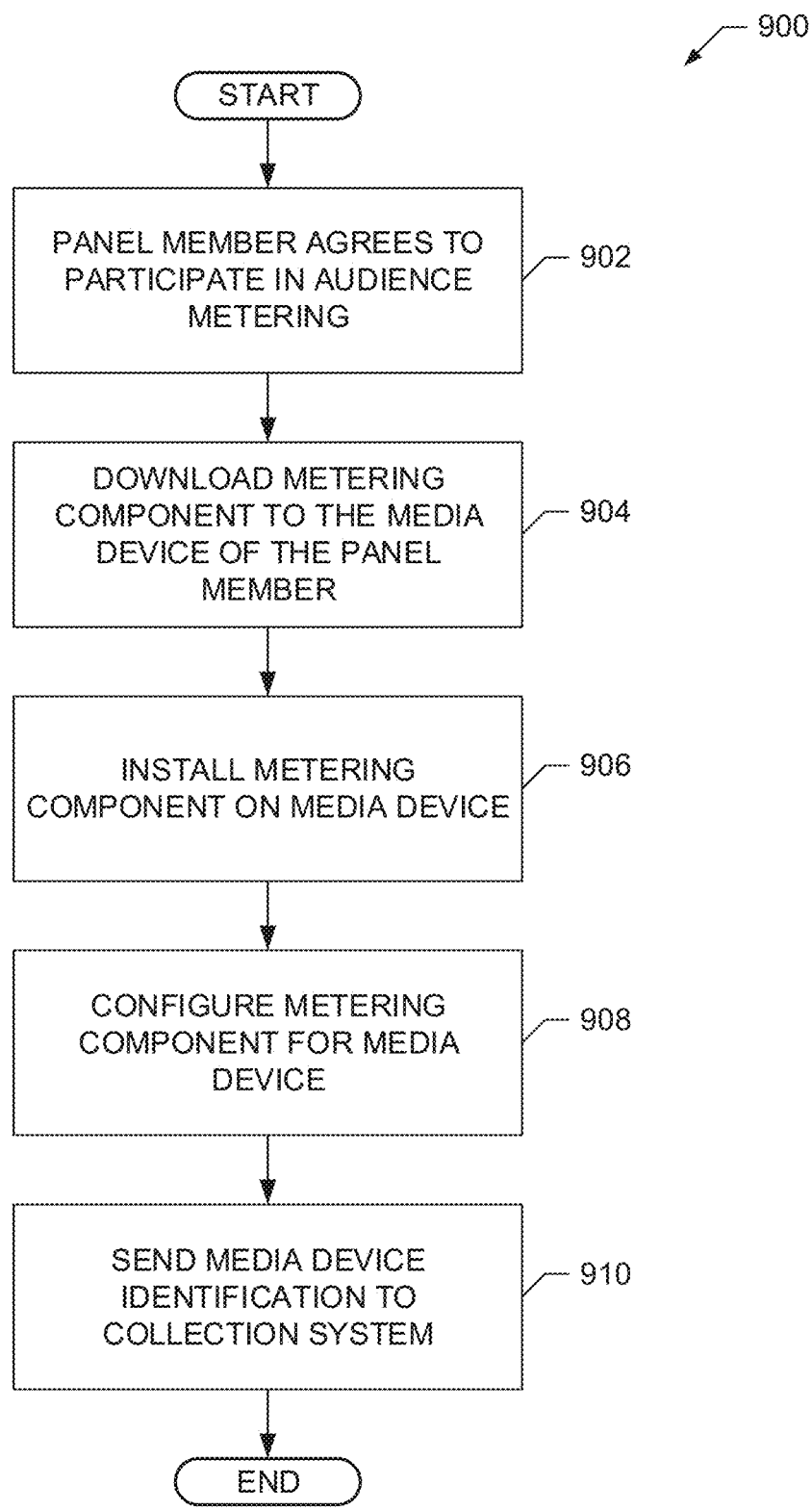
FIGS. 9 and 10 are flowcharts representative of example methods that may be performed by, for example, a processor to implement any portion or all of the example collection system of FIG. 2.

The example method 900 represented by FIG. 9 may be performed to implement the example metering component 114 and/or the example collection system 102 of FIG. 1. The example method 900 may be executed at predetermined intervals, based on an occurrence of a predetermined event, in response to a user request, etc., or on any combination thereof. For example, the method 900 may be executed at predetermined intervals, such as hourly, daily, etc. Additionally or alternatively, the example method 900 may be executed upon the occurrence of a trigger generated remotely such as, for example, a panel member activating and/or registering a newly purchased media device.

The example method 900 of FIG. 9 begins when a panel member registers and/or agrees to participate in the metering of a media device (block 902). The metering includes monitoring and/or storing a plurality of IP addresses assigned to the media device. The panel member may register by visiting a metering service website to enter the media device identification, by responding to a solicited and/or unsolicited communication from the metering service asking the panel member to participate in the metering survey, and/or by the panel member agreeing to a request from a preinstalled metering component 114 prompting the panel member to participate in the metering survey. Registering may also include the panel member indicating the type of their media device so that the corresponding metering component 114 may be installed. Once the panel member agrees to have the media device metered, the metering component 114 is downloaded to and installed on the media device (block 904). Alternatively, the metering component 114 may be manually attached to the media device. Next, the metering component 114 is installed onto the media device (block 906). This includes the media device running an installation program associated with the metering component 114. Additionally or alternatively, this may include installing any hardware components of the metering component 114 within the media device.

The example method 900 continues when the metering component 114 is configured within the media device (block 908). Configuration includes setting up one or more application adapters and/or hardware meters for the corresponding applications and/or hardware functions within the media device, creating connections between the application adapters and/or hardware meters to the network access device 112, allocating and/or creating space within a memory of the media device, polling applications and/or hardware functions for metering capability, etc. Once the metering component 114 had been configured, the metering component 114 sends media device identification to the collection system 102 (block 910). The media device identification may include a model number, serial number, and/or a MAC address. Once the collection system 102 has received the media device identification from the metering component 114, the example method 900 ends.

Figure 10:
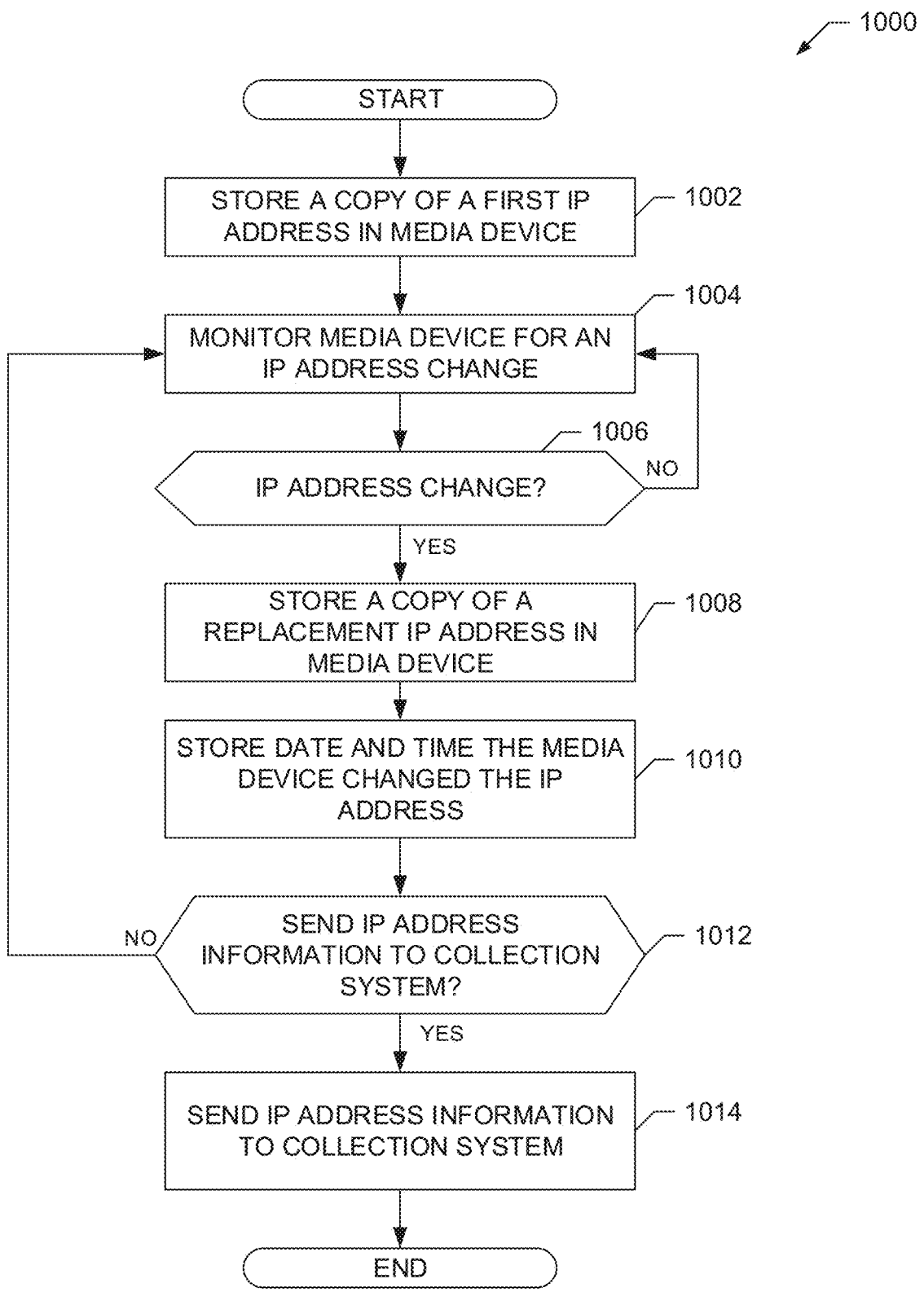

The example method 1000 represented by FIG. 10 may be performed to implement the example metering component 114 and/or the example collection system 102 of FIG. 1. The example method 1000 may be executed at predetermined intervals, based on an occurrence of a predetermined event, in response to a user request, etc., or on any combination thereof. For example, the method 1000 may be executed at predetermined intervals, such as hourly, daily, etc. Additionally or alternatively, the example method 1000 may be executed upon the occurrence of a trigger generated remotely such as, for example, a media device receiving an IP address.

The example method 1000 of FIG. 10 begins when a media device receives and stores a copy of a first IP address (block 1002). The copy of the first IP address may be stored in a memory of the media device and/or within a memory associated with the metering component 114. The first IP address may be stored in the network access device 112 of FIG. 1 to provide connectivity between the media device and the Internet. Additionally, the date and time the media device received the first IP address may be stored in memory with the copy of the first IP address. Next, the metering component 114 monitors the media device for an IP address change (block 1004). The IP address change includes the media device receiving a replacement IP address to replace the first IP address. The replacement IP address may be assigned and sent to the media device by a DHCP server and/or by a service provider. The IP address change may be in response to an expiration of the first IP address, the media device moving to a new geographical location requiring a new IP address, and/or a service provider deciding to assign the media device a new IP address.

If the metering component 114 does not detect an IP address change in the media device (block 1006), the metering component 114 continues to monitor the media device for an IP address change (block 1004). If the metering component 114 detects an IP address change (block 1006), a copy of the replacement IP address is stored in the memory of the media device (block 1008). Next, the metering component 114 stores the date and time the media device changed IP addresses to the replacement IP address (block 1010). The date and time information may be stored and associated with the stored replacement IP address in memory.

The example method 1000 continues when the metering component 114 determines if the stored IP address information is to be sent to the collection system 102. The IP address information may include a plurality of stored IP addresses assigned to the media device and/or the associated date and time information. If the IP address information is not to be sent, the metering component 114 continues to monitor the media device for an IP address change (block 1004).

If the IP address information is to be sent, the metering component sends the IP address information via the transmission medium 150 to the collection system 102 (block 1014). The metering component 114 may be programmed to send the IP address information to the collection system 102 at predetermined times. Alternatively, the collection system 102 may request the IP address information from the metering component 114. In another example method 1000, the proxy server 152 (instead of the metering component 114) of FIG. 1 may store IP addresses assigned to the media device and store the associated date and time information. The proxy server 152 may then send the collection system 102 the stored IP address information at a specified time and/or upon request from the collection system 102. Upon sending the IP address information (block 1014), the example method 1000 ends.

Figure 11:
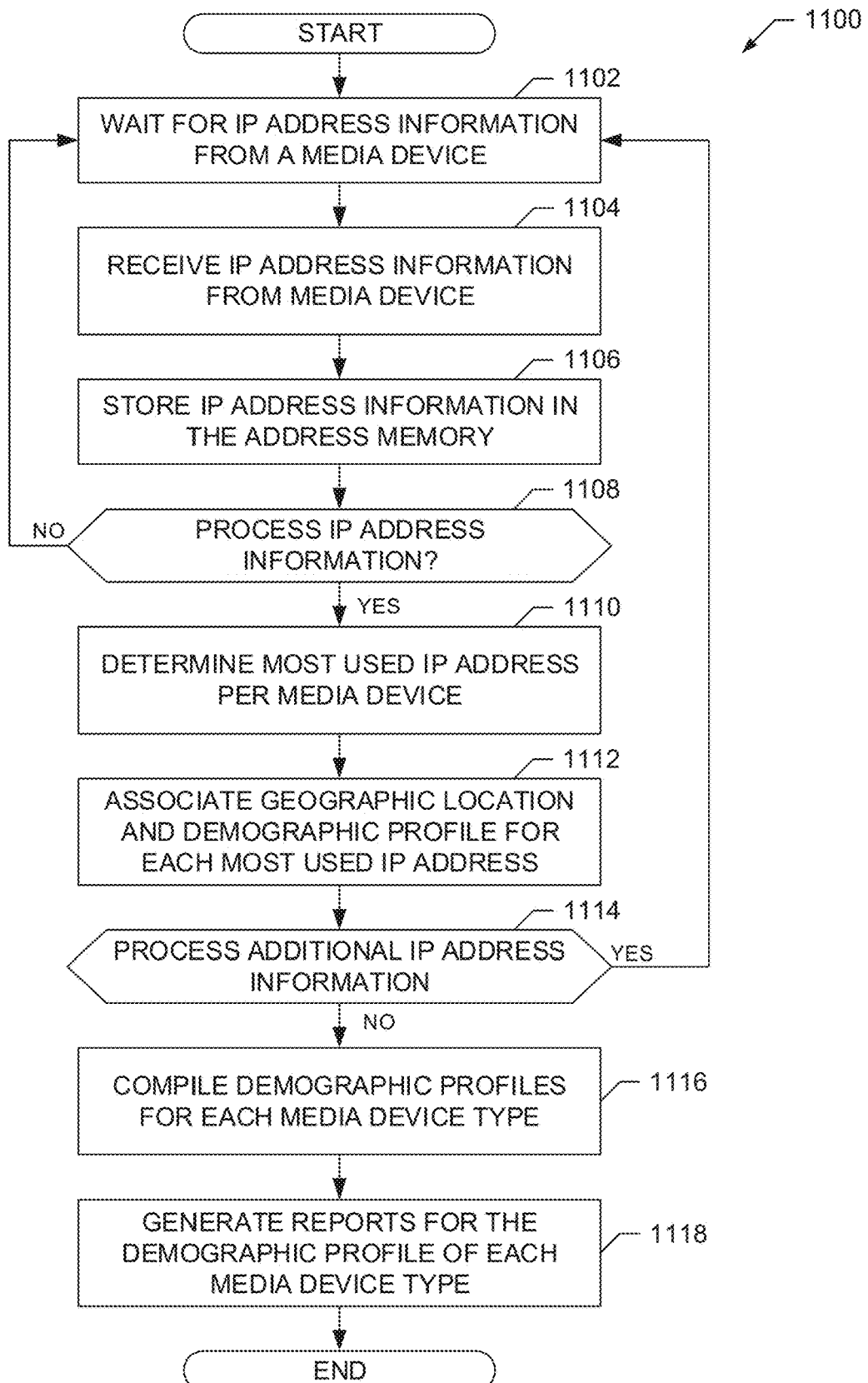
FIG. 11 is a flowchart representative of an example method that may be performed by, for example, a processor to implement any portion or all of the example collection system of FIG. 2.

The example method 1100 represented by FIG. 11 may be performed to implement the example collection system 102 of FIG. 1. The example method 1100 may be executed at predetermined intervals, based on an occurrence of a predetermined event, in response to a user request, etc., or on any combination thereof. For example, the method 1100 may be executed at predetermined intervals, such as hourly, daily, etc. Additionally or alternatively, the example method 1100 may be executed upon the occurrence of a trigger generated remotely such as, for example, an operator activating the collection system 102.

The example method 1100 of FIG. 11 begins when the collection system 102 waits for IP address information from one or more media devices (block 1102). The IP address information may include copies of one or more IP addresses assigned to a media device and/or the date and time the one or more IP addresses are assigned to the media device. The example method 1100 continues when the collection system 102 receives IP address information (block 1104). The collection system 102 may receive IP address information from one or more media devices, the proxy server 152, and/or one or more service providers 104 of FIG. 1. Next, the example method 1100 stores the received IP address information in the address memory 220 within the collection system 102 (block 1106).

Upon storing the IP address information, the collection system 102 determines if the address resolver 206 should process the stored IP address information (block 1108). The IP address information may be processed at predetermined time intervals such as, daily, weekly, monthly, etc. Alternatively, the IP address information may be processed upon a request by an operator of the collection system 102. If the IP address information is not to be processed, the collection system 102 waits for additional IP address information (block 1102). However, if the IP address information is to be processed, the address resolver 206 determines the most used IP address per media device (block 1110). The most used IP address per each media device is determined by accumulating the IP address information for a single media device. Then, the address resolver 206 determines the most used IP address by predefined criteria. The criteria may include determining which IP address was assigned to the media device for the longest time period, which IP address utilized the most bandwidth, and/or which IP address was used to access the Internet for the longest period of time.

Upon determining the most used IP address for each media device, the address resolver 206 associates a geographic location and a corresponding demographic profile with each media device (block 1112). The geographic location may include a region, a zip code, a town, a city block, and/or an address. The demographic profile may include race, ethnicity, education level, adjusted gross income per household, number of members per household, gender, population, etc. Additionally, the demographic profile may include a representation of average demographics and/or a listing of demographic information for the corresponding geographic location. A further description of methods for associating demographic information with the most used IP address are described below in conjunction with FIG. 12.

The example method 1100 continues when the collection system 102 determines if additional IP address information is to be processed (block 1114). The decision to process additional IP address information may come from an operator of the collection system 102. Alternatively, the collection system 102 may include a threshold value to determine if additional IP address information is to be processed. The threshold value may correspond to the amount of processed IP address information that is sufficient for generating statistical reports associating demographics with media device types. The collection system 102 may continue processing IP address information until the threshold value is exceeded. If additional IP address information is to be processed, the collection system 102 waits for additional IP address information from one or more media devices (block 1102).

If the collection system 102 is finished processing IP address information, the media device demographic database 226 compiles the demographic profiles and/or the geographic locations for each media device type (block 1116). Alternatively, the media device demographic database 226 may compile demographic profiles and/or the geographic locations for application types, device usage information, and/or application usage information. Next, the report generator 210 generates reports for the demographic profile for each media device type (1118). The reports may be sent to media device manufacturers, marketing entities, and/or any other interested entity. Alternatively, the report generator 210 may generate reports for the demographic profile per application type, device usage information, and/or application usage information. Upon generating reports, the example method 1100 ends.

Figure 12:
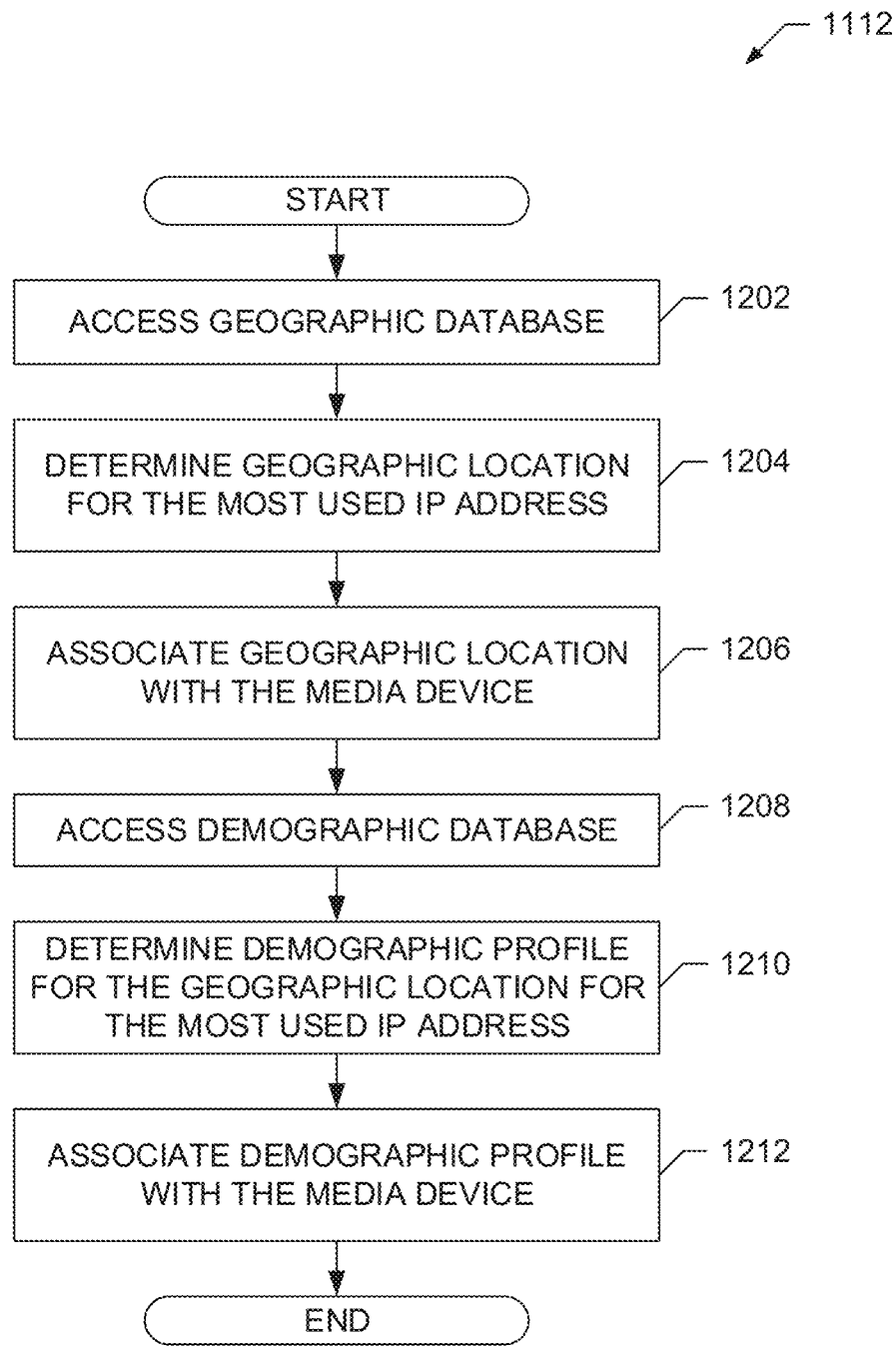
FIG. 12 is a flowchart representative of an example method that may be performed by, for example, a processor to implement any portion or all of the example address resolver of FIG. 2.

The example method 1112 represented by FIG. 12 may be performed to implement the example collection system 102 and/or the address resolver 206 of FIG. 2. The example method 1112 may be executed at predetermined intervals, based on an occurrence of a predetermined event, in response to a user request, etc., or on any combination thereof. For example, the method 1112 may be executed at predetermined intervals, such as hourly, daily, etc. Additionally or alternatively, the example method 1112 may be executed upon the occurrence of a trigger generated remotely such as, for example, the address resolver 206 receiving and/or determining a most used IP address.

The example method 1112 of FIG. 12 is a detailed description of block 1112 in FIG. 11. Although the example method 1112 is described herein as processing IP address information for a single media device, the example method 1112 may concurrently process IP address information for one or more media devices. Alternatively, the example method 1112 may process IP address information for each media device in series at each step.

The method 1112 begins when the address resolver 206 accesses the geographic database 222 (block 1202). The geographic database 222 may include cross references between IP address and regions, zip codes, towns, city blocks, street addresses, etc. Using the information in the geographic database, the address resolver 206 determines a geographic location for the most used IP address (block 1204).

The address resolver 206 determines the geographic location by matching the most used IP address to an IP address prefix and cross-referencing the IP address prefix to the geographic location. For example, a most used IP address of 135.16.152.122 is matched by the address resolver 206 to the geographic region of California that includes an IP address prefix range from 120.0.0.0 to 160.0.0.0. The geographic location is narrowed by matching the IP address prefix to an IP address range of 132.0.0.0 to 136.0.0.0 corresponding to the Los Angeles area. The geographic location is further narrowed by matching the most used IP address to an IP address prefix of 135.16.0.0 for the zip code 90015. If the information in the geographic database 222 includes block and street address information, the geographic location may be further narrowed.

Upon determining the geographic location corresponding to the most used IP address, the address resolver 206 associates the geographic location with the media device (block 1206). Associating may include linking the geographic location to an electronic record including the media device and/or the most used IP address. Alternatively, associating may include tagging a record including the media device with a reference code corresponding to the geographic location.

Upon associating the media device with the geographic location, the example method 1112 continues when the address resolver 206 accesses the demographic database 224 of FIG. 2 (block 1208). Then, the address resolver 206 determines a demographic composition and/or profile for the most used IP address (block 1210). The demographic profile is determined by matching the geographic location associated with the most used IP address to a geographic location listed in the demographic database 224. Once there is a match between the geographic locations, the demographic profile associated with the matched geographic location is associated with the most used IP address and the media device (block 1212). For example, the address resolver 206 may access the demographic database 224 that includes a range of zips codes for a particular demographic profile. The address resolver 206 determines the zip code range that matches 90015 and associates the corresponding demographic profile with the most used IP address associated with the 90015 geographic location. Then, the address resolver 206 associates the demographic profile with the media device by storing the demographic information to a record including the media device and/or the geographic location. Alternatively, the demographic profile may be associated with the media device by tagging a reference code corresponding to the demographic profile to an electronic record including the media device.

The demographic profile for any geographic location may include an average demographic profile for a typical individual in a geographic location, an average of demographic information for a geographic area, a listing of demographic profiles for a geographic area, and/or a distribution of demographic information for a geographic area. The information included within a demographic profile may include race, ethnicity, education level, adjusted gross income per household, number of members per household, gender, population, etc. Once the demographic profile is associated with the media device, the example method 1112 ends.

Figure 13:
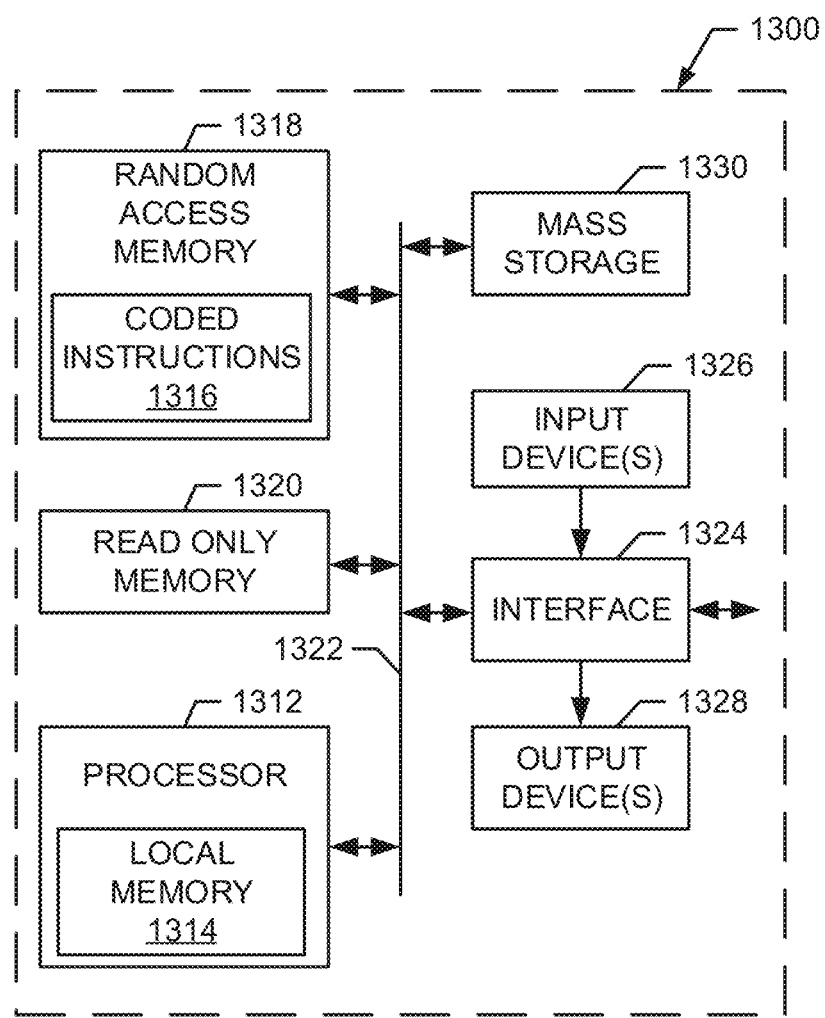
FIG. 13 is a block diagram of an example processor system that may be used to execute the example methods and apparatus described herein.

FIG. 13 is a block diagram of an example computer system 1300 capable of implementing the systems and methods disclosed herein. The computer 1300 can be, for example, a server, a personal computer, a personal digital assistant (PDA), an internet appliance, a DVD player, a CD player, a digital video recorder, a personal video recorder, a set top box, or any other type of computing device. Any or all of the example collection system 102, the example metering component 114, the example address resolver 206, and/or the example processor 204 may be implemented by the example computer 1300.

The system 1300 of the illustrated example includes a processor 1312 such as a general purpose programmable processor. The processor 1312 includes a local memory 1314, and executes coded instructions 1316 present in the local memory 1314 and/or in another memory device. The coded instructions 1316 when executed, may perform some or all of the methods represented in FIGS. 9, 10, 11, and 12. The processor 1312 may be any type of processing unit, such as one or more microprocessors from the Intel® Centrino® family of microprocessors, the Intel® Pentium® family of microprocessors, the Intel® Itanium® family of microprocessors, the Intel® Core® family of microprocessors, and/or the Intel® XScale® family of processors. Of course, other processors from other families are also appropriate.

The processor 1312 is in communication with a main memory including a volatile memory 1318 and a non-volatile memory 1320 via a bus 1322. The volatile memory 1318 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1320 may be implemented by flash memory and/or any other desired type of memory device. Access to the main memory 1318, 1320 is typically controlled by a memory controller.

The computer 1300 also includes an interface circuit 1324. The interface circuit 1324 may be implemented by any type of interface standard, such as an Ethernet interface, a universal serial bus (USB), and/or a third generation input/output (3GIO) interface.

One or more input devices 1326 are connected to the interface circuit 1324. The input device(s) 1326 permit a user to enter data and commands into the processor 1312. The input device(s) can be implemented by, for example, a keyboard, a mouse, a touchscreen, a track-pad, a trackball, an isopoint and/or a voice recognition system.

One or more output devices 1328 are also connected to the interface circuit 1324. The output devices 1328 can be implemented, for example, by display devices (e.g., a liquid crystal display, a cathode ray tube display (CRT)), by a printer and/or by speakers. The interface circuit 1324, thus, typically includes a graphics driver card.

The interface circuit 1324 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1300 also includes one or more mass storage devices 1330 for storing software and data. Examples of such mass storage devices 1330 include floppy disk drives, hard drive disks, compact disk drives and digital versatile disk (DVD) drives. The mass storage devices 1330 may implement any or all of the example address memory 220, the example media device demographic database 226, the example geographic database 222, and/or the example demographic database 224. Additionally or alternatively, the volatile memory 1318 may implement any or all of the example address memory 220, the example media device demographic database 226, the example geographic database 222, and/or the example demographic database 224.

At least some of the above described example methods and/or system are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An audience measurement computing system comprising:
    at least one processor;
    memory having stored therein computer readable instructions that, when executed by the at least one processor, cause the audience measurement computing system to perform a set of operations comprising:
        obtaining a first plurality of Internet Protocol (IP) addresses associated with a first media device and a second plurality of IP addresses associated with a second media device, the first media device corresponding to a first device type, the second media device corresponding to a second device type, the first device type different from the second device type;
        selecting a first IP address from the first plurality of IP addresses based on first usage information for the first media device;
        selecting a second IP address from the second plurality of IP addresses based on second usage information for the second media device;
        identifying a first geographic location corresponding to the first IP address and a second geographic location corresponding to the second IP address;
        associating a first demographic profile with the first media device based on the first geographic location;
        associating a second demographic profile with the second media device based on the second geographic location;
        associating the first demographic profile with the first device type; and
        associating the second demographic profile with the second device type; and
        generating a report associating the first demographic profile with the first device type and associating the second demographic profile with the second device type.

2. The audience measurement computing system of claim 1, wherein selecting the first IP address from the first plurality of IP addresses based on the first usage information for the first media device comprises selecting the first IP address from the first plurality of IP addresses based on the first IP address being associated with a largest amount of device usage relative to other IP addresses of the first plurality of IP addresses, and
    wherein selecting the second IP address from the second plurality of IP addresses based on the second usage information for the second media device comprises selecting the second IP address from the second plurality of IP addresses based on the second IP address being associated with a largest amount of device usage relative to other IP addresses of the second plurality of IP addresses.

3. The audience measurement computing system of claim 1, wherein selecting the first IP address from the first plurality of IP addresses based on the first usage information for the first media device comprises selecting the first IP address from the first plurality of IP addresses based on the first IP address being assigned to the first media device for a longest duration relative to other IP addresses of the first plurality of IP addresses, and wherein selecting the second IP address from the second plurality of IP addresses based on the second usage information for the second media device comprises selecting the second IP address from the second plurality of IP addresses based on the second IP address being assigned to the second media device for a longest duration relative to other IP addresses of the second plurality of IP addresses.

4. The audience measurement computing system of claim 1, wherein selecting the first IP address from the first plurality of IP addresses based on the first usage information for the first media device comprises selecting the first IP address from the first plurality of IP addresses based on the first IP address being used by the first media device to access the Internet for a longest duration relative to other IP addresses of the first plurality of IP addresses, and wherein selecting the second IP address from the second plurality of IP addresses based on the second usage information for the second media device comprises selecting the second IP address from the second plurality of IP addresses based on the second IP address being used by the second media device to access the Internet for a longest duration relative to other IP addresses of the second plurality of IP addresses.

5. The audience measurement computing system of claim 1, wherein selecting the first IP address from the first plurality of IP addresses based on the first usage information for the first media device comprises selecting the first IP address from the first plurality of IP addresses based on the first IP address being associated with a greatest amount of bandwidth utilization relative to other IP addresses of the first plurality of IP addresses, and wherein selecting the second IP address from the second plurality of IP addresses based on the second usage information for the second media device comprises selecting the second IP address from the second plurality of IP addresses based on the second IP being associated with a greatest amount of bandwidth utilization relative to other IP addresses of the second plurality of IP addresses.

6. The audience measurement computing system of claim 1, the operations further comprising:

monitoring the first media device to detect an IP address change to a new IP address; and storing the new IP address as one of the first plurality of IP addresses.

7. A non-transitory computer-readable storage medium, having stored thereon machine-readable instructions that, when executed by at least one processor, cause performance of operations comprising:

obtaining a first plurality of Internet Protocol (IP) addresses associated with a first media device and a second plurality of IP addresses associated with a second media device, the first media device corresponding to a first device type, the second media device corresponding to a second device type, the first device type different from the second device type;

selecting a first IP address from the first plurality of IP addresses based on first usage information for the first media device;

selecting a second IP address from the second plurality of IP addresses based on second usage information for the second media device;

identifying a first geographic location corresponding to the first IP address and a second geographic location corresponding to the second IP address;

associating a first demographic profile with the first media device based on the first geographic location;

associating a second demographic profile with the second media device based on the second geographic location;

associating the first demographic profile with the first device type; and associating the second demographic profile with the second device type; and generating a report associating the first demographic profile with the first device type and associating the second demographic profile with the second device type.

8. The non-transitory computer-readable storage medium of claim 7, wherein selecting the first IP address from the first plurality of IP addresses based on the first usage information for the first media device comprises selecting the first IP address from the first plurality of IP addresses based on the first IP address being associated with a largest amount of device usage relative to other IP addresses of the first plurality of IP addresses, and wherein selecting the second IP address from the second plurality of IP addresses based on the second usage information for the second media device comprises selecting the second IP address from the second plurality of IP addresses based on the second IP address being associated with a largest amount of device usage relative to other IP addresses of the second plurality of IP addresses.

9. The non-transitory computer-readable storage medium of claim 7, wherein selecting the first IP address from the first plurality of IP addresses based on the first usage information for the first media device comprises selecting the first IP address from the first plurality of IP addresses based on the first IP address being assigned to the first media device for a longest duration relative to other IP addresses of the first plurality of IP addresses, and wherein selecting the second IP address from the second plurality of IP addresses based on the second usage information for the second media device comprises selecting the second IP address from the second plurality of IP addresses based on the second IP address being assigned to the second media device for a longest duration relative to other IP addresses of the second plurality of IP addresses.

10. The non-transitory computer-readable storage medium of claim 7, wherein selecting the first IP address from the first plurality of IP addresses based on the first usage information for the first media device comprises selecting the first IP address from the first plurality of IP addresses based on the first IP address being used by the first media device to access the Internet for a longest duration relative to other IP addresses of the first plurality of IP addresses, and wherein selecting the second IP address from the second plurality of IP addresses based on the second usage information for the second media device comprises selecting the second IP address from the second plurality of IP addresses based on the second IP address being used by the second media device to access the Internet for a longest duration relative to other IP addresses of the second plurality of IP addresses.

11. The non-transitory computer-readable storage medium of claim 7, wherein selecting the first IP address from the first plurality of IP addresses based on the first usage information for the first media device comprises selecting the first IP address from the first plurality of IP addresses based on the first IP address being associated with a greatest amount of bandwidth utilization relative to other IP addresses of the first plurality of IP addresses, and
wherein selecting the second IP address from the second plurality of IP addresses based on the second usage information for the second media device comprises selecting the second IP address from the second plurality of IP addresses based on the second IP being associated with a greatest amount of bandwidth utilization relative to other IP addresses of the second plurality of IP addresses.

12. A method performed by an audience measurement computing system, the audience measurement computing system comprising at least one processor, the method comprising:
obtaining a first plurality of Internet Protocol (IP) addresses associated with a first media device and a second plurality of IP addresses associated with a second media device, the first media device corresponding to a first device type, the second media device corresponding to a second device type, the first device type different from the second device type;
selecting a first IP address from the first plurality of IP addresses based on first usage information for the first media device;
selecting a second IP address from the second plurality of IP addresses based on second usage information for the second media device;
identifying a first geographic location corresponding to the first IP address and a second geographic location corresponding to the second IP address;
associating a first demographic profile with the first media device based on the first geographic location;
associating a second demographic profile with the second media device based on the second geographic location;
associating the first demographic profile with the first device type;
associating the second demographic profile with the second device type; and
generating a report associating the first demographic profile with the first device type and associating the second demographic profile with the second device type.

13. The method of claim 12, wherein selecting the first IP address from the first plurality of IP addresses based on the first usage information for the first media device comprises selecting the first IP address from the first plurality of IP addresses based on the first IP address being associated with a largest amount of device usage relative to other IP addresses of the first plurality of IP addresses, and
wherein selecting the second IP address from the second plurality of IP addresses based on the second usage information for the second media device comprises selecting the second IP address from the second plurality of IP addresses based on the second IP address being associated with a largest amount of device usage relative to other IP addresses of the second plurality of IP addresses.

14. The method of claim 12, wherein selecting the first IP address from the first plurality of IP addresses based on the first usage information for the first media device comprises selecting the first IP address from the first plurality of IP addresses based on the first IP address being assigned to the first media device for a longest duration relative to other IP addresses of the first plurality of IP addresses, and
wherein selecting the second IP address from the second plurality of IP addresses based on the second usage information for the second media device comprises selecting the second IP address from the second plurality of IP addresses based on the second IP address being assigned to the second media device for a longest duration relative to other IP addresses of the second plurality of IP addresses.

15. The method of claim 12, wherein selecting the first IP address from the first plurality of IP addresses based on the first usage information for the first media device comprises selecting the first IP address from the first plurality of IP addresses based on the first IP address being used by the first media device to access the Internet for a longest duration relative to other IP addresses of the first plurality of IP addresses, and
wherein selecting the second IP address from the second plurality of IP addresses based on the second usage information for the second media device comprises selecting the second IP address from the second plurality of IP addresses based on the second IP address being used by the second media device to access the Internet for a longest duration relative to other IP addresses of the second plurality of IP addresses.

16. The method of claim 12, wherein selecting the first IP address from the first plurality of IP addresses based on the first usage information for the first media device comprises selecting the first IP address from the first plurality of IP addresses based on the first IP address being associated with a greatest amount of bandwidth utilization relative to other IP addresses of the first plurality of IP addresses, and
wherein selecting the second IP address from the second plurality of IP addresses based on the second usage information for the second media device comprises selecting the second IP address from the second plurality of IP addresses based on the second IP being associated with a greatest amount of bandwidth utilization relative to other IP addresses of the second plurality of IP addresses.

17. The method of claim 12, further comprising:
monitoring the first media device to detect an IP address change to a new IP address; and
storing the new IP address as one of the first plurality of IP addresses.

18. The audience measurement computing system of claim 1, wherein the first geographic location includes at least one of a region, a zip code, a town, a city block, or an address, and wherein the first demographic profile associated with the first media device based on the first geographic location is a representative demographic profile corresponding to a demographic composition of the first geographic location.

19. The non-transitory computer-readable storage medium of claim 7, the operations further comprising:
monitoring the first media device to detect an IP address change to a new IP address; and storing the new IP address as one of the first plurality of IP addresses.

20. The method of claim 12, wherein the first geographic location includes at least one of a region, a zip code, a town, a city block, or an address, and wherein the first demographic profile associated with the first media device based on the first geographic location is a representative demographic profile corresponding to a demographic composition of the first geographic location.

\* \* \* \* \*